(12) United States Patent
Kuroda et al.

(10) Patent No.: US 6,234,932 B1
(45) Date of Patent: May 22, 2001

(54) CONTROL APPARATUS FOR A HYBRID VEHICLE

(75) Inventors: Shigetaka Kuroda; Kenji Nakano; Hideyuki Takahashi; Takashi Kiyomiya; Teruo Wakashiro; Youichi Iwata; Keisuke Uchida; Atsushi Matsubara; Atsushi Izumiura; Asao Ukai; Yasuo Nakamoto; Fumihiko Konno, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,144

(22) Filed: Aug. 31, 1999

(30) Foreign Application Priority Data

Sep. 2, 1998 (JP) .................................................. 10-248762

(51) Int. Cl.[7] ....................................................... B60K 1/02
(52) U.S. Cl. .................................. 477/3; 477/7; 180/65.1
(58) Field of Search ........... 477/3, 7, 15; 180/65.1–65.6

(56) References Cited

U.S. PATENT DOCUMENTS

| 3,791,473 | * | 2/1974 | Rosen | 180/60 A |
| 4,021,677 | * | 5/1977 | Rosen et al. | 290/40 R |
| 5,346,031 | * | 9/1994 | Gardner | 180/179 |
| 5,359,308 | * | 10/1994 | Sun et al. | 335/216 |
| 5,667,029 | * | 9/1997 | Urban et al. | 180/65.2 |

* cited by examiner

Primary Examiner—Sherry Estremsky
Assistant Examiner—Tisha D. Lewis
(74) Attorney, Agent, or Firm—Armstrong, Westerman, Hattori, McLeland & Naughton, LLP

(57) ABSTRACT

A control apparatus for a hybrid vehicle having a dynamotor which operates as a motor for assisting the output of an internal combustion engine and which operates as a generator for regenerating the running energy of the vehicle. The control apparatus, in accordance with operating conditions of the vehicle, controls an assist operation for supplying electric power from a storage device to the dynamotor and a regenerative operation for charging the storage device by the generated power of the dynamotor, and determines an acceleration mode for performing an assist operation or a cruising mode for selectively performing the assist operation and a regenerative operation, in accordance with an engine rotational speed and a throttle valve opening degree, or a vehicle speed of the vehicle and the throttle valve opening degree.

12 Claims, 24 Drawing Sheets

FIG. 9

| Ne / TH | NEAST0 | NEAST1 | - - - - - - | NEAST19 |
|---|---|---|---|---|
| THAST0 | ASTPWR#n00 | ASTPWR#n10 | - - - - - - | ASTPWR#n190 |
| THAST1 | ASTPWR#n01 | ASTPWR#n11 | - - - - - - | ASTPWR#n191 |
| ⋮ | ⋮ | ⋮ | - - - - - - | ⋮ |
| THAST10 | ASTPWR#n010 | ASTPWR#n110 | - - - - - - | ASTPWR#n1910 |

FIG. 11

| Ne<br>PB | NECAST0 | NECAST1 | - - - - - - | NECAST19 |
|---|---|---|---|---|
| PBCAST0 | QCAPCMD#n00 | QCAPCMD#n10 | - - - - - - | QCAPCMD#n190 |
| PBCAST1 | QCAPCMD#n01 | QCAPCMD#n11 | - - - - - - | QCAPCMD#n191 |
| ⋮ | ⋮ | ⋮ | - - - - - - | ⋮ |
| PBCAST10 | QCAPCMD#n010 | QCAPCMD#n110 | - - - - - - | QCAPCMD#n1910 |

FIG. 13

| Ne / P$_B$ | NERGN0 | NERGN1 | - - - - - - | NERGN19 |
|---|---|---|---|---|
| PBRGN0 | REGEN#n00 | REGEN#n10 | - - - - - - | REGEN#n190 |
| PBRGN1 | REGEN#n01 | REGEN#n11 | - - - - - - | REGEN#n191 |
| ⋮ | ⋮ | ⋮ | - - - - - - | ⋮ |
| PBRGN10 | REGEN#n010 | REGEN#n110 | - - - - - - | REGEN#n1910 |

FIG. 14

| Ne / P$_B$ | NERGN0 | NERGN1 | - - - - - - | NERGN19 |
|---|---|---|---|---|
| PBRGN0 | REGENBR#n00 | REGENBR#n10 | - - - - - - | REGENBR#n190 |
| PBRGN1 | REGENBR#n01 | REGENBR#n11 | - - - - - - | REGENBR#n191 |
| ⋮ | ⋮ | ⋮ | - - - - - - | ⋮ |
| PBRGN10 | REGENBR#n010 | REGENBR#n110 | - - - - - - | REGENBR#n1910 |

CONTROL APPARATUS FOR A HYBRID VEHICLE

BACKGROUND OF THE INVENTION

1. Field of the Invention

The present invention relates to a hybrid vehicle having an internal combustion engine and a motor as a vehicle drive source, and, more particularly, to an apparatus for controlling the hybrid vehicle.

2. Description of the Related Background Art

Hybrid vehicles having an engine and a motor as a drive source are known. A control apparatus for controlling such a hybrid vehicle is disclosed in Japanese Laid-Open Patent Publication No. 3(1991)-121928, for example.

The control apparatus drives a motor in accordance with the operating condition of a vehicle as well as controls the output of an engine. Specifically, the operation mode of the motor is determined in accordance with the operating condition of the vehicle. In the acceleration mode, electric drive power is supplied to the motor to perform an assist operation for assisting the output of the engine. In the deceleration mode, regenerative operation is performed to store regenerative electric power produced by the motor to a capacitor as a high-voltage storage device. The electric power stored in the capacitor is used as electric power motor drive in the assist operation.

Recently, other than the acceleration mode and deceleration mode, a cruising mode for controlling a constant speed of a vehicle has been suggested. In the cruising mode, either the assist operation or regenerative operation is selectively performed by taking into account operating conditions such as the speed of the vehicle and the state of the capacitor charge.

However, it has been a difficult problem to distinguish clearly between the acceleration mode and the cruising mode in accordance with the operating conditions of a vehicle. That is, it was necessary to distinguish the operating conditions under which the operation mode of the motor is to be changed from the acceleration mode to the cruising mode and the operating conditions under which the operation mode is to be changed from the cruising mode to the acceleration mode, so as to improve fuel consumption of the engine and ensure drivability.

SUMMARY OF THE INVENTION

Accordingly, an object of the present invention is to provide a control apparatus for a hybrid vehicle, which enables operation mode change between the acceleration mode and cruising mode with fuel consumption of the engine being improved and drivability bing ensured.

A control apparatus for a hybrid vehicle having an internal combustion engine and a dynamotor as drive sources of the vehicle, the dynamotor operating as a motor for assisting the output of the internal combustion engine and operating as a generator for regenerating running energy of the vehicle, the apparatus comprising: control means, in accordance with operating conditions of the vehicle, for controlling an assist operation for supplying electric power from a storage device to the dynamotor and a regenerative operation for charging the storage device by the generated power of the dynamotor; and determination means for determining that the operating condition of the vehicle is in one of a plurality of operation modes including at least, an acceleration mode for performing an assist operation, a cruising mode for selectively performing the assist operation and a regenerative operation; wherein the determination means determines either the acceleration mode or the cruising mode in accordance with an engine rotational speed and a throttle valve opening degree of the internal combustion engine, or a vehicle speed of the vehicle and the throttle valve opening degree.

According to the control apparatus for a hybrid vehicle, since the operating mode is determined to be either the acceleration mode or the cruising mode in response to the engine rotational speed of an internal combustion engine and throttle valve opening degree or the vehicle speed of the vehicle and throttle valve opening degree, the operation mode can be changed from the acceleration to cruising mode so as to improve the fuel consumption of the engine and ensure good drivability.

Furthermore, in the control apparatus for a hybrid vehicle according to the present invention, the acceleration mode is determined when the throttle valve opening degree has exceeded the engine rotational speed or the acceleration mode start threshold value corresponding to the vehicle speed and the cruising mode is determined when the throttle valve opening degree has fallen below the acceleration mode end threshold value which is less than the acceleration mode start threshold value in response to the engine rotational speed or the speed of the vehicle. And an undesired mode variation between the acceleration mode and the cruising mode, caused by a slight operation variation of the throttle valve, can be suppressed for improving drivability.

Still furthermore, in the control apparatus for a hybrid vehicle according to the present invention, the control means includes data maps for setting the assist amount showing an electric power level to be supplied from the storage device to the dynamotor have parameters of the engine rotational speed and the throttle valve opening degree and are provide for as many as the number that is determined by the gear ratio of a transmission and an air/fuel ratio of the supply mixture of the internal combustion engine. The control means also detects the gear ratio of the transmission and the air/fuel ratio of the supply mixture of the internal combustion engine; selects a data map corresponding to respective detection results of the gear ratio of the transmission and the air/fuel ratio of the supply mixture of the internal combustion engine from the data maps; sets an assist amount corresponding to the engine rotational speed and the throttle valve opening degree by using the selected data map; corrects the assist amount thus set in accordance with the output voltage of the storage device; and performs the assist operation in accordance with the corrected assist amount.

With this configuration, according to the control apparatus of the present invention, not only are the engine rotational speed and throttle valve opening degree taken into account but also the operating conditions of the transmission resulting from the operator and air/fuel ratio of the supply mixture. Thus, fuel consumption of the engine can be reduced and at the same time the setting of the assist amount can be optimized to operate the motor at high efficiency.

In the control apparatus for a hybrid vehicle according to the present invention, the acceleration mode start threshold value and the acceleration mode end threshold value are gradually increased while the vehicle is climbing a sloping road or running at high speed, and the acceleration mode start threshold value and the acceleration mode end threshold value are gradually decreased when the vehicle is not climbing a sloping road or running at high speed. Accordingly, while the vehicle is climbing a sloping road or traveling at high speed, the storage device can be charged by the regeneration operation in the cruising mode and unnecessary use of the electric power stored in the storage device can be prevented.

Furthermore, in the control apparatus for a hybrid vehicle according to the present invention, the acceleration mode start threshold value and the acceleration mode end threshold value are gradually increased when a variation of the throttle valve opening degree per unit time is smaller than an opening level variation corresponding to the electric power of the storage device. Thus, the storage device can be charged by the regenerative operation with the operating mode shifted comparatively to the cruising mode even in a case of a large opening level variation of the throttle valve where the storage device has a slight amount of power left.

Still furthermore, in the control apparatus for a hybrid vehicle according to the present invention, the acceleration mode start threshold value and the acceleration mode end threshold value are initialized in the case where a variation of the throttle valve opening degree per unit time is equal to or greater than the opening level variation corresponding to the amount of electric power stored in the storage device. Thus, the acceleration mode is employed immediately when the throttle valve opening degree suddenly changes, and thus the output of the engine can be assisted by a motor.

Still furthermore, in the control apparatus for a hybrid vehicle according to the present invention, a target voltage of the storage device is set in accordance with the vehicle speed, and the acceleration mode start threshold value and the acceleration mode end threshold value are increased by a correction value corresponding to a difference in voltage between the output voltage of the storage device and the target voltage. Thus, the cruising mode region is expanded in response to the relationship between the vehicle speed and the output voltage of the storage device, and thus the energy stored in the storage device can be efficiently utilized.

Still furthermore, in the control apparatus for a hybrid vehicle according to the present invention, the correction value is varied in accordance with the size of a load of the internal combustion engine. Therefore, for example, when the engine load is increased due to the use of an air-conditioner, the cruising mode region is expanded and necessary energy can be stored in the storage device by regenerative operation.

BRIEF DESCRIPTION OF THE DRAWINGS

FIG. 9 is a view showing an ASTPWR data map during an acceleration period.

FIG. 11 is a view showing a cruising assist target electric-power QCAPCMD data map.

FIG. 13 is a view showing an REGEN data map during the first deceleration period.

FIG. 14 is a view showing an REGEN data map during the second deceleration period.

DETAILED DESCRIPTION OF THE PREFERRED EMBODIMENT

An embodiment of the present invention will be explained below in detail with reference to the drawings.

Figure 1:
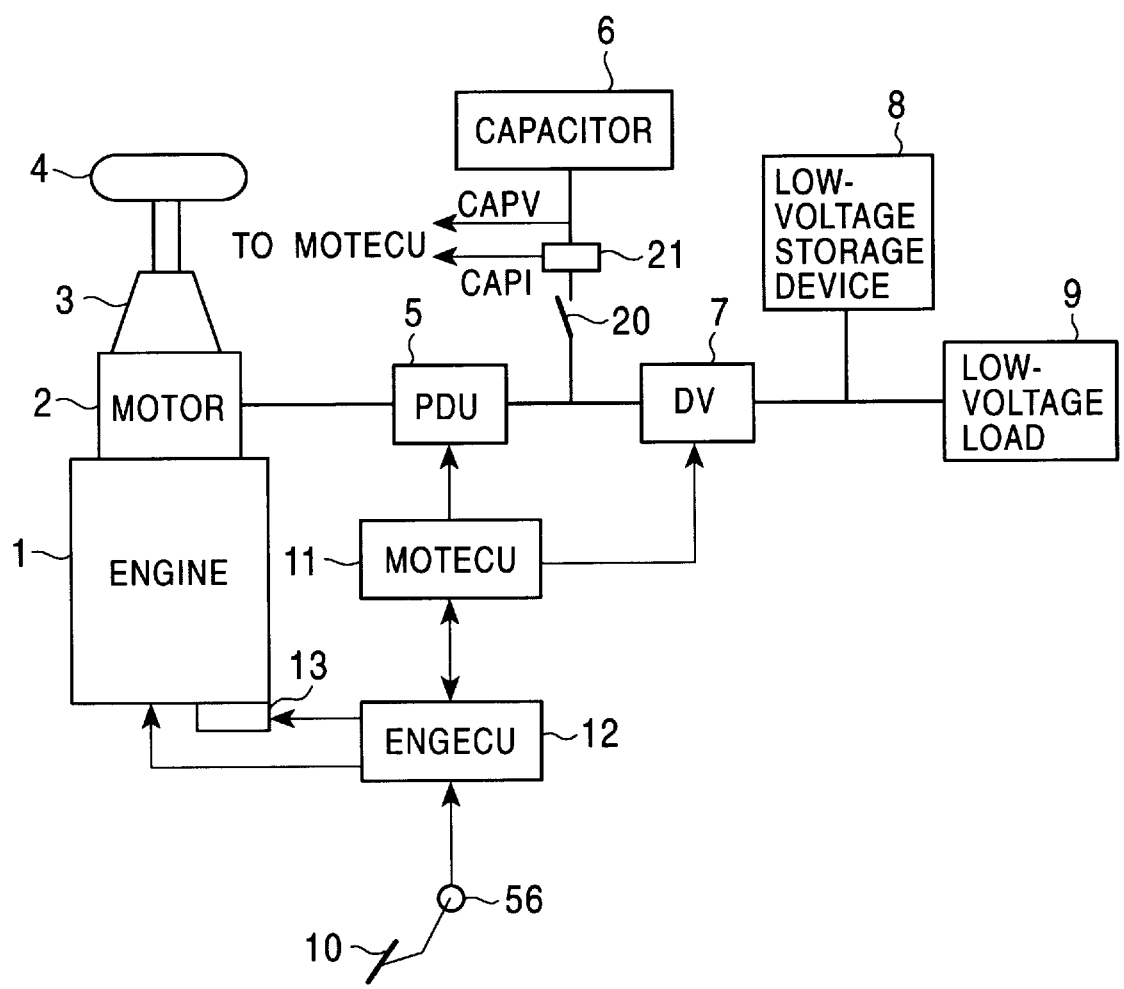
FIG. 1 is a block diagram showing an embodiment of the present invention.

FIG. 1 shows a control apparatus for a hybrid vehicle according to the present invention. In this control apparatus for a hybrid vehicle, the crankshaft of an internal combustion engine 1 is directly coupled to the rotational shaft of a DC motor 2 as a dynamotor. The rotation of the rotational shaft of the motor 2 is transmitted to a drive wheel 4 via a transmission 3. The transmission 3 is of the manual type. The motor 2 is coupled with a PDU (Power Drive Unit) 5. During an assist operation period in which the motor 2 operates as a normal motor in order to assist output power of the engine 1, the PDU 5 supplies electric power to the motor 2. During a regenerative operation period in which the motor 2 is operated as a generator without supplying electric power, the PDU 5 supplies regenerative electric power to a capacitor 6, acting as a high-voltage storage device.

The connection terminals of the capacitor 6 are connected with a MOTECU (Motor Electronic Control Unit) 11, which will be described later, for detecting a voltage between the terminals. Moreover, the connection terminals of the capacitor 6 are connected with a current detector 21. The current detector 21 detects an input or output current of the capacitor 6 passing through the current detector 21 itself to supply the detected current value to the MOTECU 11 as data. A contact switch 20 is provided between the current detector 21 and the PDU 5 and is controlled to be turned on or off by the MOTECU 11.

A DV (Down Converter) 7 is connected to a connecting line from the PDU 5 to the contact switch 20. The DV 7 converts the high voltage of the connecting line to a low voltage of approximately 12V. The output of the DV 7 is connected to a battery 8 as a low-voltage storage device and a low-voltage load 9 of the vehicle.

Figure 2:
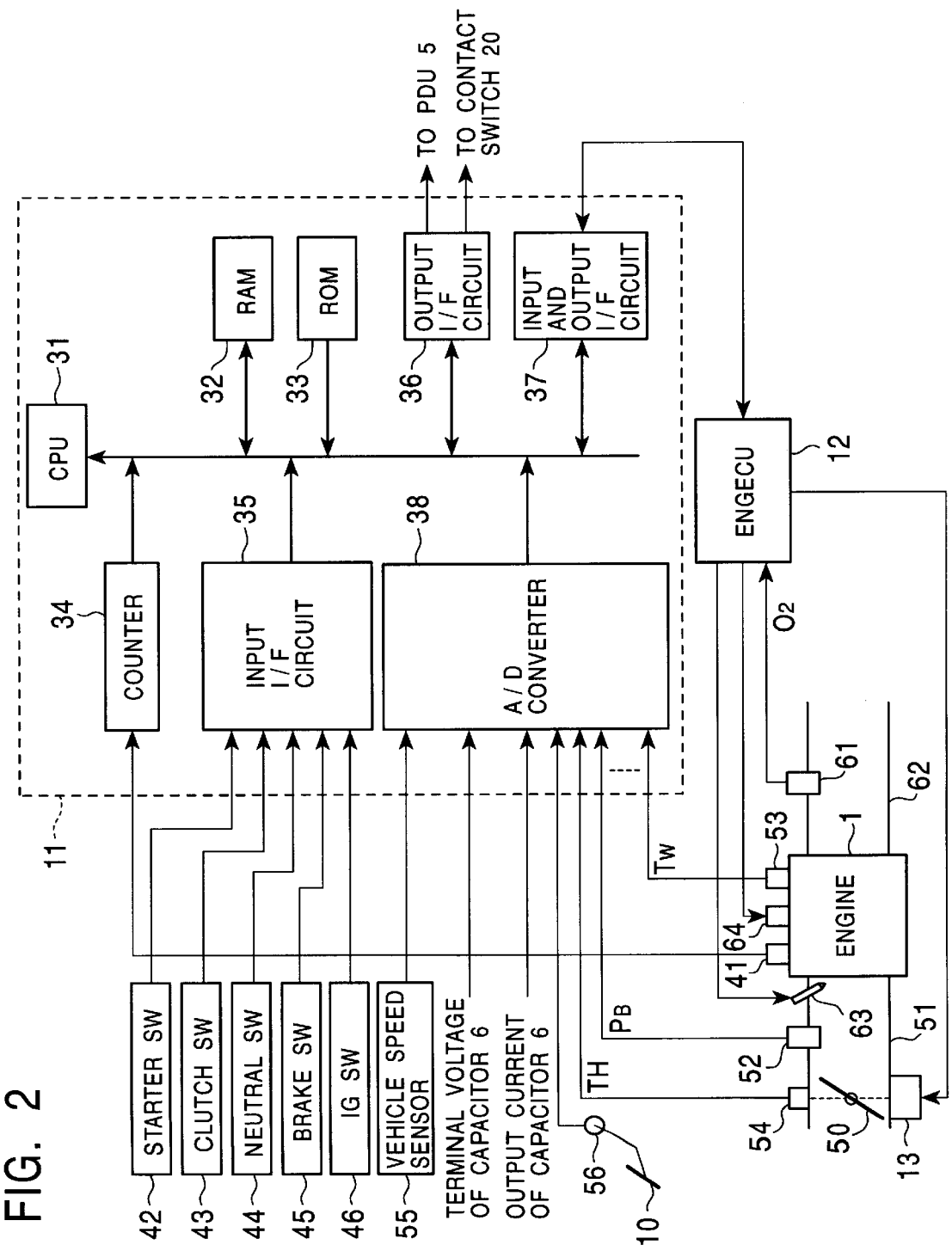
FIG. 2 is a block diagram showing the internal configuration of an MOTECU in a unit of FIG. 1.

The MOTECU 11 controls the rotation of the motor 2 via the PDU 5. As shown in FIG. 2, the MOTECU 11 comprises CPU 31, RAM 32, ROM 33, counter 34, an input interface (I/F) circuit 35, an output interface circuit 36, an I/O interface circuit 37, and an A/D converter 38. The CPU 31, RAM 32, ROM 33, counter 34, input interface (I/F) circuit 35, output interface circuit 36, I/O interface circuit 37, and A/D converter 38 are all connected to a common bus.

The counter 34 is reset by a crank pulse output from a crank angle sensor 41 and counts clock pulses output from a clock generator which is not shown, generating a signal indicating an engine rotational speed Ne by counting the number of clock pulses.

The input interface circuit 35 is connected to a starter switch (SW) 42 which detects a start of the engine 1, a clutch switch 43 which detects whether a clutch (not shown) of a transmission 3 is engaged or not, a neutral switch 44 which detects whether the shift lever of the transmission 3 is in the neutral position or not, a brake switch 45 which detects operation of the brake pedal (not shown) of the vehicle, and an ignition (IG) switch 46. The input interface circuit 35 holds and outputs data showing ON/OFF states of each of the switches 42 to 46.

The A/D converter 38 is provided for converting analog signals from a plurality of sensors for detecting vehicle operation parameters such as intake pipe pressure PB, cooling water temperature Tw, throttle valve opening degree TH, vehicle speed V, and degree of accelerator pedal pressure AP into digital signals. The intake pipe pressure PB is detected by an intake pipe pressure sensor 52 that is provided in an intake pipe 51 downstream from a throttle valve 50. The cooling water temperature Tw is detected by a cooling water temperature sensor 53. The throttle valve opening degree TH is detected by a throttle valve sensor 54. The vehicle speed V is detected by a vehicle speed sensor 55. The degree of accelerator pedal pressure AP is an operation pressure on an accelerator pedal 10 and is detected by an accelerator pedal sensor 56. In addition, the A/D converter 38 is supplied with a voltage across the capacitor 6, and an output signal from the A/D converter 38 represents a voltage QCAP between the terminals of the capacitor 6 as a digital value.

The output interface circuit 36 sets operation of the PDU 5 in accordance with an assist amount command or a regeneration amount command that is produced by operation of CPU 31 which is described later, and turns on or off the contact switch 20 in accordance with a command of the CPU 31. The I/O interface circuit 37 is a circuit for data communications with an ENGECU (Engine Electronic Control Unit) 12.

The ENGECU 12 performs engine control such as fuel injection control and ignition timing control of the engine 1. Although connecting lines are not shown in FIG. 2, the ENGECU 12 is connected with the foregoing crank angle sensor 41, switches 42 through 46, and several sensors 52 through 56 as well as an oxygen concentration sensor 61. The oxygen concentration sensor 61 is provided on an exhaust pipe 62 to detect the oxygen concentration O2 in the exhaust gas. The oxygen concentration sensor 61 is a binary output type oxygen concentration sensor that generates two different levels. One level is generated when an output signal level of the oxygen concentration sensor is smaller than or equal to a threshold value corresponding to a stoichiometric air/fuel ratio, the other level is generated when an output signal level of the oxygen concentration sensor is larger than the threshold value. Since the internal configuration of the ENGECU 12 is the same as that of the aforementioned MOTECU 11, no explanation is given here. In the ENGECU 12, a CPU (not shown) processes a fuel injection control routine in which a fuel injection time period Tout is determined based on the aforementioned vehicle operation parameters and the engine rotational speed Ne. An injector 63 is driven during the fuel injection time period Tout thus determined. The injector 63 is provided near an intake port of an intake pipe 51 of the internal combustion engine and injects fuel when driven. Moreover, in the ENGECU 12, the CPU processes an ignition timing control routine to generate a spark discharge from each ignition plug (not shown) of an ignition unit 64 in accordance with the ignition timing control.

Furthermore, since the above throttle valve 50 is of a so-called drive-by-wire (DBW) type, the engine 1 is provided with a throttle actuator 13 which drives the throttle valve 50 to change the opening degree of the throttle valve 50. In the ENGECU 12, the CPU processes a throttle valve opening degree control routine to determine a target throttle valve opening degree θth, in accordance with the aforementioned vehicle operation parameters such as the throttle valve opening degree TH, vehicle speed V, and degree of accelerator pedal pressure AP and then the opening level of the throttle valve 50 is controlled via the throttle actuator 13 in order to achieve the target throttle valve opening degree θth The following explanation will be given for control operation of the motor 2 on the basis of operation of the CPU 31.

The CPU 31 in the MOTECU 11 repeatedly executes a motor control routine, for example, every 10 msec, and determines an operation mode at the executed time to set the assist amount ASTPWR or regeneration amount REGEN corresponding to the determined operation mode.

Figure 3:
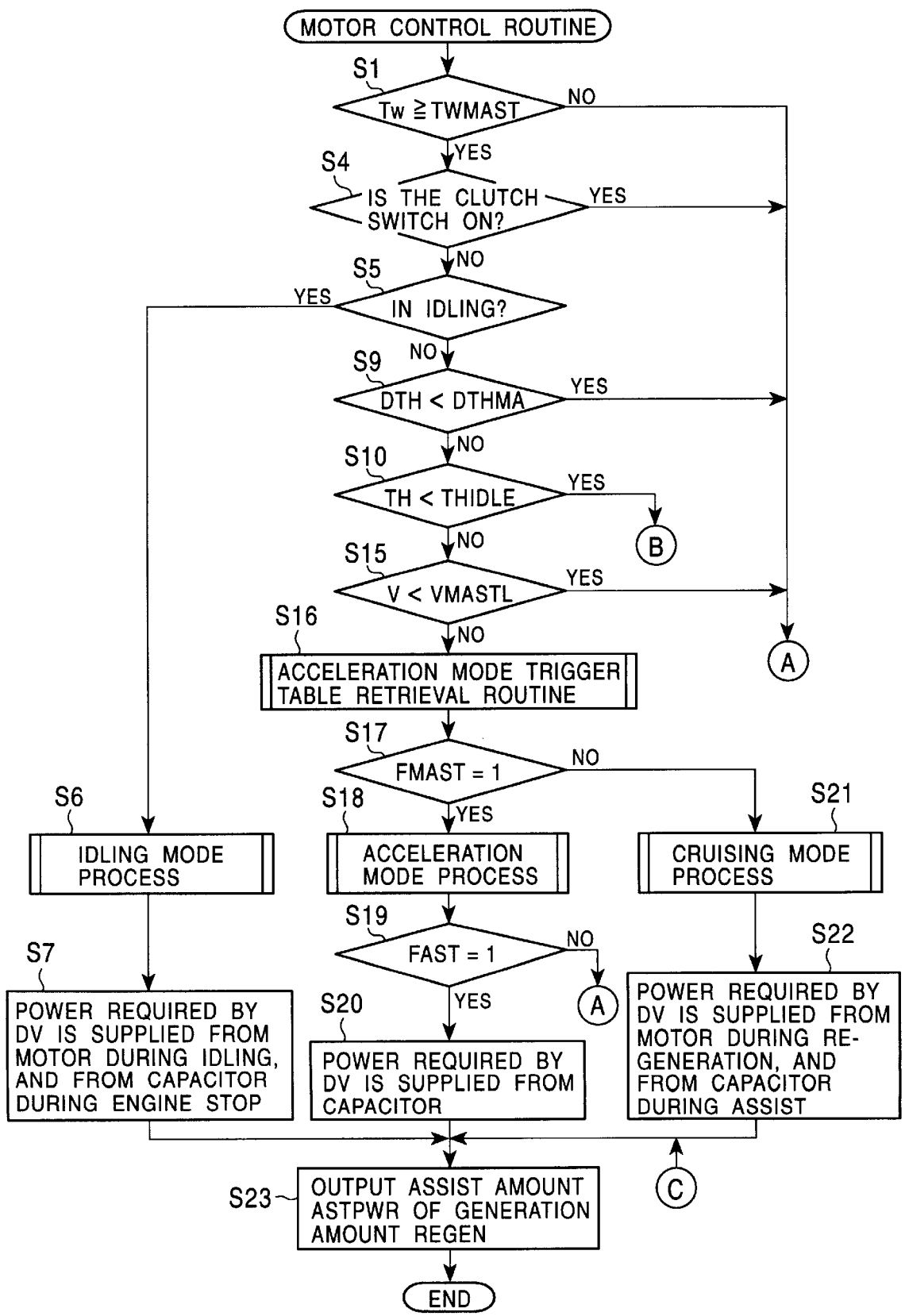
FIG. 3 is a flowchart showing a motor control routine.
Figure 4:
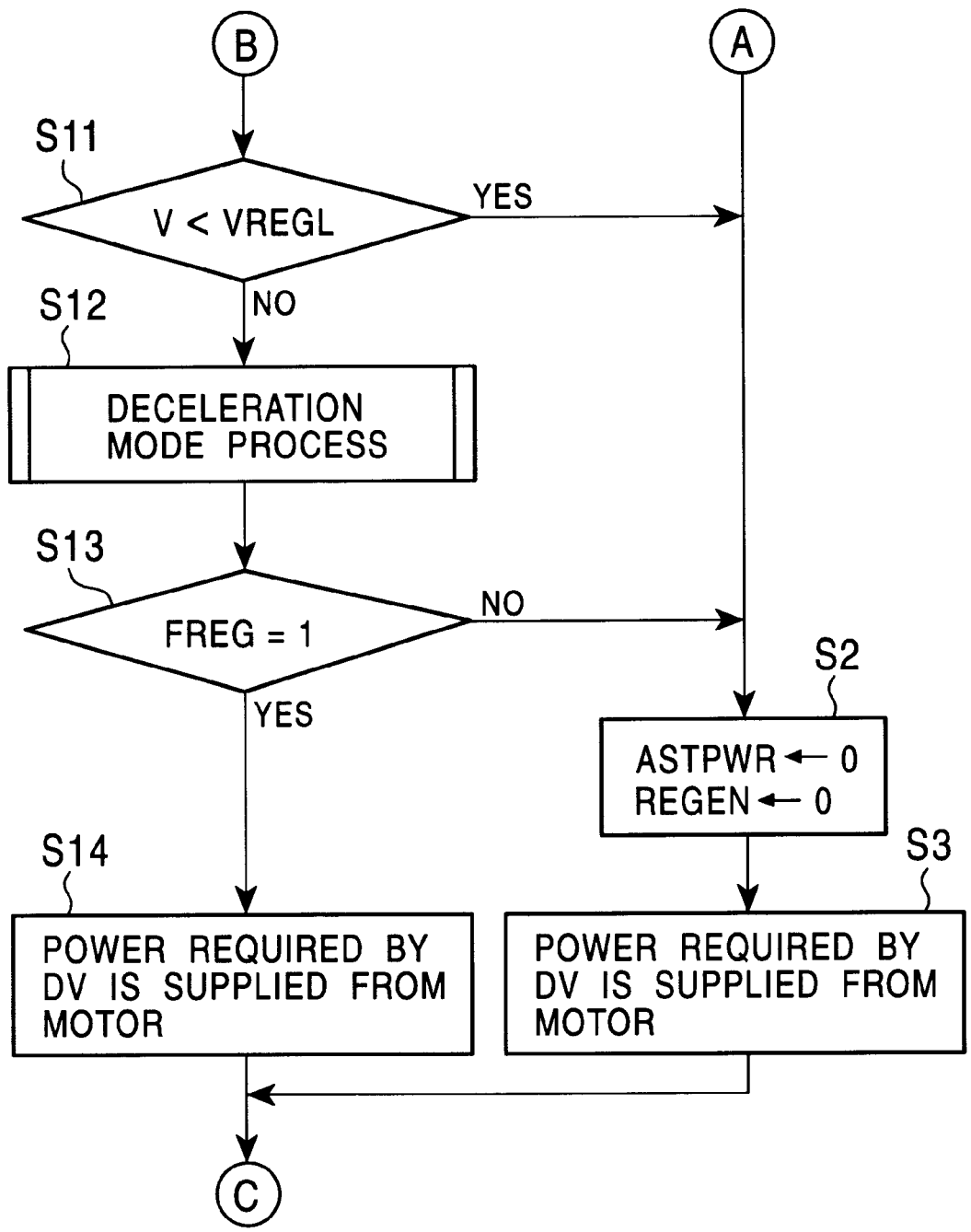
FIG. 4 is a flowchart showing the subsequent part of the flowchart of the motor control routine of FIG. 3.

In the foregoing motor control routine, as shown in FIG. 3 and FIG. 4, the CPU 31 determines first whether an engine cooling water temperature Tw has been raised to a temperature equal to or higher than an assist/regeneration allowable temperature TWMAST (for example, 40° C.) (step S1). If Tw<TWMAST, the CPU 31 sets both assist amount ASTPWR and regeneration amount REGEN to zero (step S2) and supplies regenerative electric power produced by the motor 2 to the DV 7 as electric power required by the DV 7 (step S3).

If Tw≧TWMAST, it is determined whether the clutch switch 43 has been turned on (step S4). If the clutch switch 43 has been turned on, the clutch is in a power cut-off state, the CPU 31 proceeds to step S2. If the clutch switch 43 is off, the clutch is in a power transmitting state and it is determined whether the engine 1 is in an idling state or not (step S5). The idling state is determined by detecting if a throttle valve opening degree TH is in a completely closed state at a vehicle speed V which is equal to 0 km/h.

If the idling state is detected, the operation mode is set to an idling mode to allow the engine 1 to continue the idling operation (step S6). When the engine 1 is in an idling state, the regenerative electric power produced by the motor 2 is supplied to the DV 7 as electric power required by the DV 7, and when the engine 1 is stopped, the electric power stored in the capacitor 6 is supplied to the DV 7 as electric power required by the DV 7 (step S7).

If the idling state is not detected, it is determined whether an opening degree variation DTH of the throttle valve 50 per unit time (for example, 100 msec) is smaller than a decision value DTHMA (for example, −5 degrees) corresponding to a large closing amount of the throttle valve or not (step S9). The throttle valve opening degree variation DTH is detected as the difference between current and previous values of the throttle valve opening degree TH which is detected for each unit of time by means of the throttle valve opening degree sensor 54. If DTH<DTHMA, since the throttle valve 50 has been performed operation enough to move in the closing direction, the CPU 31 proceeds to step S2. If DTH≧DTHMA, it is determined whether the throttle valve opening degree TH is less than a value THIDLE (for example, 0.3 degrees) corresponding to complete closing of the throttle vale or not (step S10). If TH<THIDLE, since the throttle valve 50 is almost completely closed, it is determined whether the vehicle speed V is less than a regeneration reference speed VREGL (for example, 10 km/h) or not (step S11). If V<VREGL, the CPU 31 proceeds to step S2 since regenerative electric power produced by the motor 2 should not be stored in the capacitor 6 under a regenerative braking state of the motor 2.

On the other hand, if V≧VREGL, since the vehicle is under a deceleration state, the operation mode is changed to a deceleration mode (step S12). The process of the CPU 31 in the deceleration mode will be described later. After the deceleration mode process has been performed, it is determined whether a regeneration flag FREG is equal to 1 or not (step S13). The regeneration flag FREG is set to 0 or 1 through the deceleration mode process. If FREG=0, since a regeneration amount REGEN of the motor 2 has not been calculated through the deceleration mode process, the CPU 31 proceeds to step S2. If FREG=1, since the regeneration amount REGEN of the motor 2 has been calculated through the deceleration mode process, the regenerative electric power produced by the motor 2 is supplied to the DV 7 as electric power required by the DV 7 (step S14).

If it has been determined that TH≧THIDLE at step S10, it is determined whether the vehicle speed V is lower than an assist reference speed VMASTL (for example, 5 km/h) or not (step S15). If V<VMASTL, the CPU 31 proceeds to step S2 since assist electric power should not be supplied to the motor 2 for assisting the output power of the engine 1. On the other hand, if V≧VMASTL, an acceleration mode trigger table retrieval routine is performed (step S16). Although the acceleration mode trigger table retrieval routine will be described in detail later, in the acceleration mode trigger table retrieval routine, either an acceleration mode or a cruising mode is determined as the operation mode. If the acceleration mode is determined, the acceleration flag FMAST is set to 1. If the cruising mode is determined, the acceleration flag FMAST is set to 0.

After having performed step S16, the CPU 31 determines whether the acceleration flag FMAST has been set to 1 or not (step S17). If FMAST=1, the operation mode is determined to be the acceleration mode (step S18). This acceleration mode process will be described later. After having performed the acceleration mode process, the CPU 31 determines whether an assist flag FAST is equal to 1 or not (step S19). The assist flag FAST is set to 0 or 1 through the acceleration mode process. If FAST=0, since the assist amount ASTPWR of the motor 2 has not been calculated in the acceleration mode process, CPU 31 proceeds to step S2. If FAST=1, since the assist amount ASTPWR of the motor 2 has been calculated in the acceleration mode process, the required electric power of the DV 7 is controlled to be supplied from the capacitor 6 to the DV 7 (step S20).

If it has been determined that FMAST=0 at step S17, it is determined that the operation mode is the cruising mode (step S21). This cruising mode process will be described later as well. After the cruising mode process has been performed, at the time of power generation by the motor 2, the CPU 31 supplies the electric power produced by the motor 2 to the DV 7 as electric power required by DV 7. At the time of assist operation, the electric power stored in the capacitor 6 is supplied to the DV 7 as electric power required by DV 7 (step S22).

In each of the operation mode processes at steps S6, S12, S18, and S21, the assist amount ASTPWR or the regenerative amount REGEN is set. The CPU 31 outputs the set assist amount ASTPWR or the regenerative amount REGEN to the output interface circuit 36 (step S23). The output interface circuit 36 controls the operation of the PDU 5 in response to the assist amount ASTPWR or the regenerative amount REGEN supplied by the CPU 31. For the assist amount ASTPWR, the PDU 5 supplies assist electric power to the motor 2 in accordance with the assist amount ASTPWR. For the regenerative amount REGEN, the motor 2 is brought into the regenerative braking state, and the PDU 5 acquires regenerative electric power corresponding to the regenerative amount REGEN from the motor 2 to supply it to the capacitor 6 or the DV 7.

Figure 5:
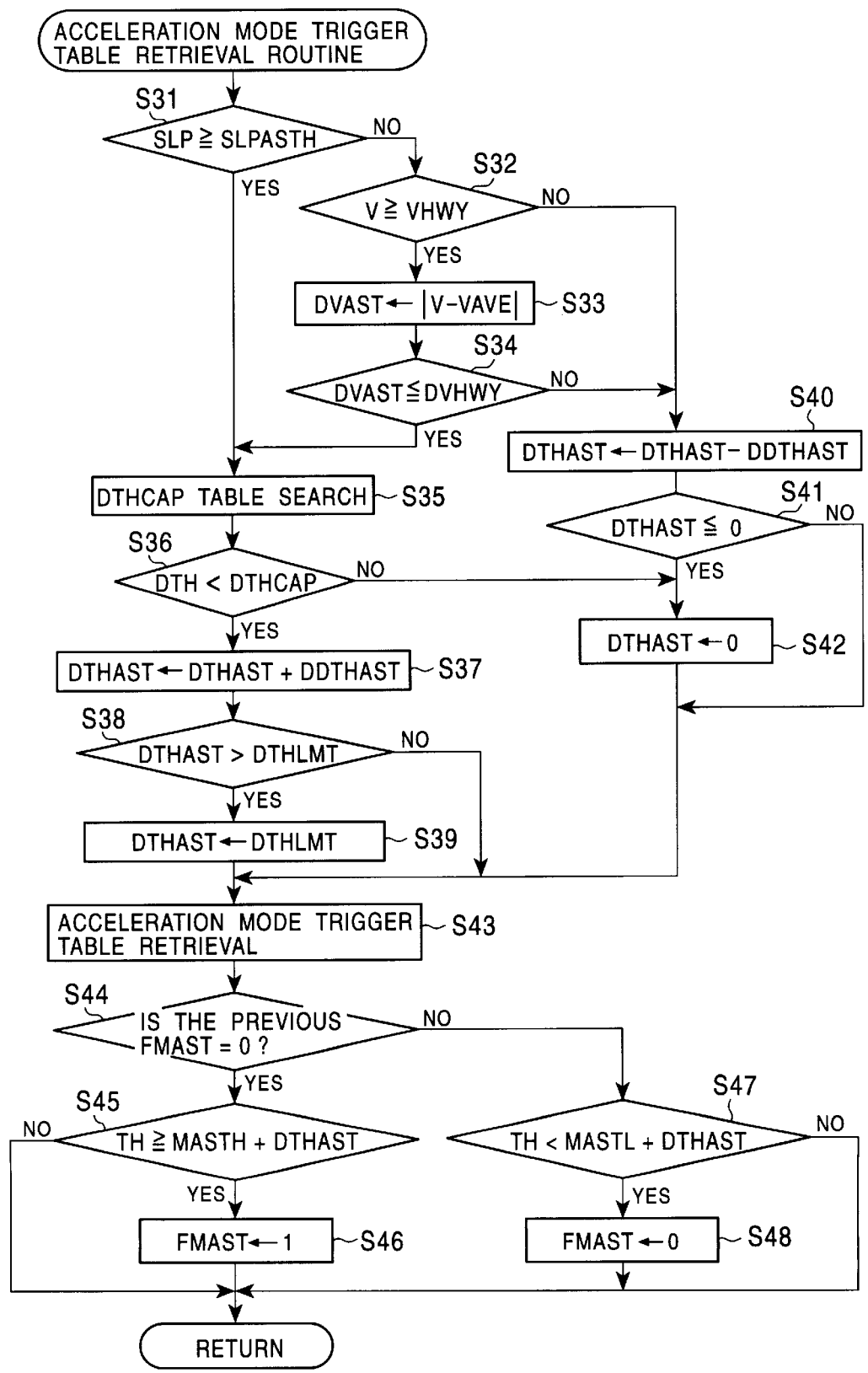
FIG. 5 is a flowchart showing an acceleration mode trigger table retrieval routine.

As shown in FIG. 5, in the acceleration mode trigger table retrieval routine, the CPU 31 determines whether the slope angle SLP is greater than a reference slope angle SLPASTH (for example, 5%) for deciding the acceleration mode or not (step S31). If SLP≧SLPASTH, the current road is determined to have a slope, the CPU 31 proceeds to step S35.

If it has been determined that SLP<SLPASTH at step S31, it is determined whether the vehicle speed V is greater than a reference vehicle speed VHWY (for example, 80 km/h) corresponding to a high speed or not (step S32). If V≧VHWY, the absolute value of the difference between the vehicle speed V and an smoothing average vehicle speed VAVE, |V−VAVEI| is determined as the vehicle speed difference DVAST (step S33). Then, it is determined whether the vehicle speed difference DVAST is less than a vehicle speed difference DVHWY (for example, 5 km/h) for maintaining a high speed or not (step S34). If DVAST≦DVHWY, since the vehicle can be regarded as running on a highway, the CPU 31 proceeds to step S35.

Figure 6:
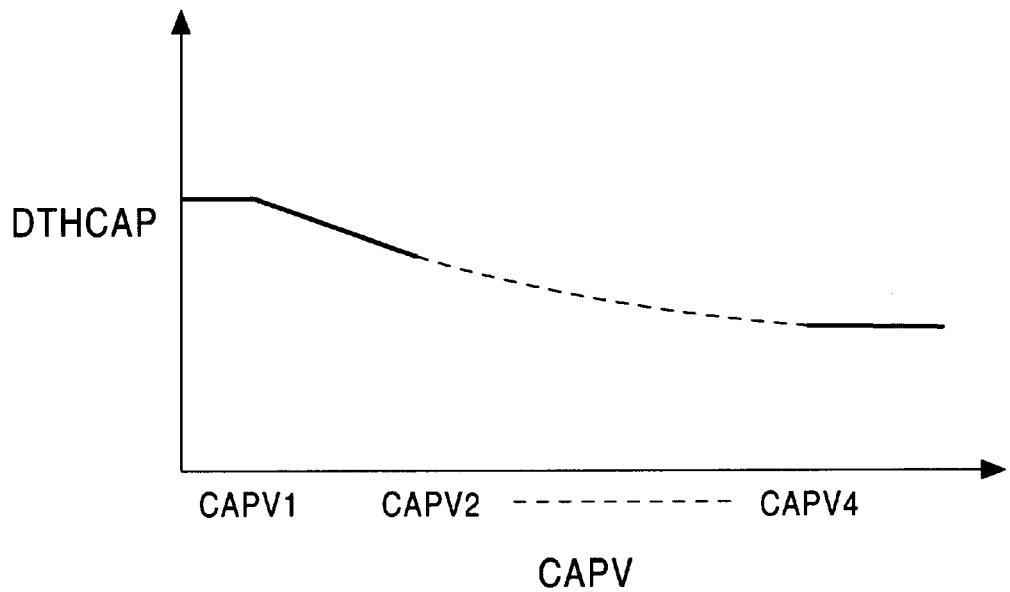
FIG. 6 is a view showing a CAPV-DTHCAP characteristic.

At step S35, a throttle returning decision variation DTHCAP for deciding an acceleration mode limit line is searched in the table. The throttle returning decision variation DTHCAP is set by searching a DTHCAP table stored previously in ROM 33 in accordance with the output voltage CAPV of the capacitor 6. For the relationship between the output voltage CAPV of the capacitor 6 shown by the DTHCAP table and the throttle returning decision variation DTHCAP, for example, as shown in FIG. 6, the DTHCAP gradually decreases as the output voltage CAPV of the capacitor 6 increases as CAPV1, CAPV2, and so on.

After having searched the DTHCAP, the CPU 31 determines whether the throttle valve opening degree variation DTH is smaller than the searched DTHCAP or not (step S36). If DTH<DTHCAP, a correction value DTHAST for correcting a reference value for deciding the acceleration mode can be newly obtained by adding only a unit variation DDTHAST (for example, 0.01 degrees) to the correction value DTHAST (step S37). Then, it is determined whether the calculated correction value DTHAST is greater than a predetermined upper limit DTHLMT (for example, 10 degrees) or not (step S38). If DTHAST>DTHLMT, the correction value DTHAST is set to an upper limit DTHLMT (step S39). If DTHAST≦DTHLMT, the current value of the DTHAST is kept as it is.

If V<VHWY at step S32 or DVAST>DVHWY at step S34, a correction value DTHAST can be newly obtained by subtracting only a unit variation DDTHAST from the correction value DTHAST (step S40). Then, it is determined whether the correction value DTHAST is equal to or less than 0 or not (step S41). If DTHAST≦0, the correction value DTHAST is set to a value equal to zero (step S42), and then the CPU 31 proceeds to step S43. If DHTAST≧0, CPU 31 proceeds to step S43 immediately.

If it was determined that DTH≧DTHCAP at step S36, the CPU 31 sets as DTHAST=0 at step S42 and then proceed to step S43.

At step S43, the acceleration flag FMAST is searched in accordance with the engine rotational speed Ne and the throttle valve opening degree TH by using the acceleration mode trigger table.

Figure 7:
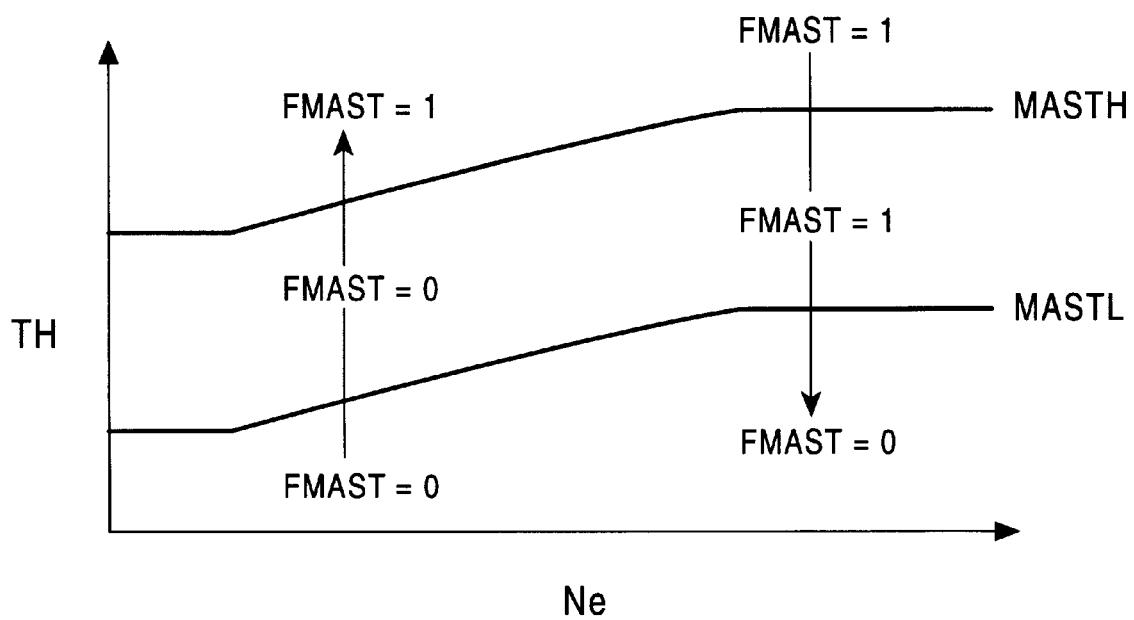
FIG. 7 is a view showing a setting characteristic of an acceleration flag FMAST in accordance with an acceleration mode trigger table.

The acceleration mode trigger table is stored previously in ROM 33 and is set so as to set the acceleration flag FMAST in accordance with the engine rotational speed Ne and the throttle valve opening degree TH, as shown in FIG. 7. That is, an acceleration mode start threshold value MASTH and an acceleration mode end threshold value MASTL gradually increases when increasing the engine rotational speed Ne, at the time the throttle valve opening degree TH increases from a value equal to or less than the threshold value MASTL, FMAST=0 until it exceeds the threshold value MASTH. Exceeding the threshold value MASTH makes FMAST=1 by regarding the operating condition as a condition for increasing acceleration. On the contrary, when the throttle valve opening degree TH decreases below a value equal to or greater than the threshold value MASTH, FMAST=1 until it decreases below the threshold value MASTL. When it decreases below the threshold value MASTL, then FMAST=0. In addition, acceleration mode trigger tables are individually provided according to the number of gear positions of the transmission 3 and acceleration mode trigger tables are provided according to the target air/fuel ratio of air/fuel ratio control of the mixture supplied to the engine 1 (namely the stoichiometric air/fuel ratio and lean air/fuel ratios which are leaner than the stoichiometric air/fuel ratio). Therefore, an acceleration mode trigger table is selected in accordance with the gear positions of the transmission 3 and the target air/fuel ratio, and an acceleration flag FMAST corresponding to the engine rotational speed Ne and the throttle valve opening degree TH at that time is searched in the acceleration mode trigger table selected. Each acceleration mode trigger table is previously set so as to provide a determination of acceleration modes and cruising modes suitable for the conditions of gear positions and air/fuel ratios.

After the acceleration flag FMAST has been searched using an acceleration mode trigger table, it is determined whether the previous acceleration flag FMAST was equal to 0 or not (step S44). If the previous FMAST=0, to determine whether the current acceleration flag FMAST should be set to 1 or not, the current acceleration flag FMAST increased by the correction value DTHAST used for setting the acceleration mode start threshold value MASTH in the acceleration mode trigger table corresponding to the current engine rotational speed Ne is compared with the throttle valve opening degree TH (step S45). If TH≧MASTH+DTHAST, the acceleration flag FMAST is set to 1 (step S46). If TH<MASTH+DTHAST, it is kept as it is so that FMAST=0.

If it was determined that the previous FMAST=1 at step S44, to determine whether the current acceleration flag FMAST should be set to 0 or not, the current acceleration flag FMAST increased by the correction value DTHAST used for setting the acceleration mode end threshold value MASTL in the acceleration mode trigger table corresponding to the current engine rotational speed Ne is compared with the throttle valve opening degree TH (step S47). If TH<MASTL+DTHAST, the acceleration flag FMAST is set to 0 (step S48). If TH≧MASTL+DTHAST, it is kept as it is so that FMAST=1.

As mentioned above, after the acceleration flag FMAST has been updated by increasing the acceleration mode start threshold value MASTH or the acceleration mode end threshold value MASTL in the acceleration mode trigger table corresponding to the current engine rotational speed Ne by an amount of DTHAST, the acceleration flag FMAST corresponding to the current throttle valve opening degree TH is searched and set. Since the acceleration flag FMAST searched and set here is used for step S17, and to determine either the acceleration mode or the cruising mode as the operating mode, updating the acceleration flag FMAST results in expanding the cruising mode regions during climbing an inclined road or driving at high speed.

As examples of setting the assist amount ASTPWR and the regeneration amount REGEN in the operation mode process, the aforementioned acceleration mode process, cruising mode process, and deceleration mode process will be explained below.

Figure 8:
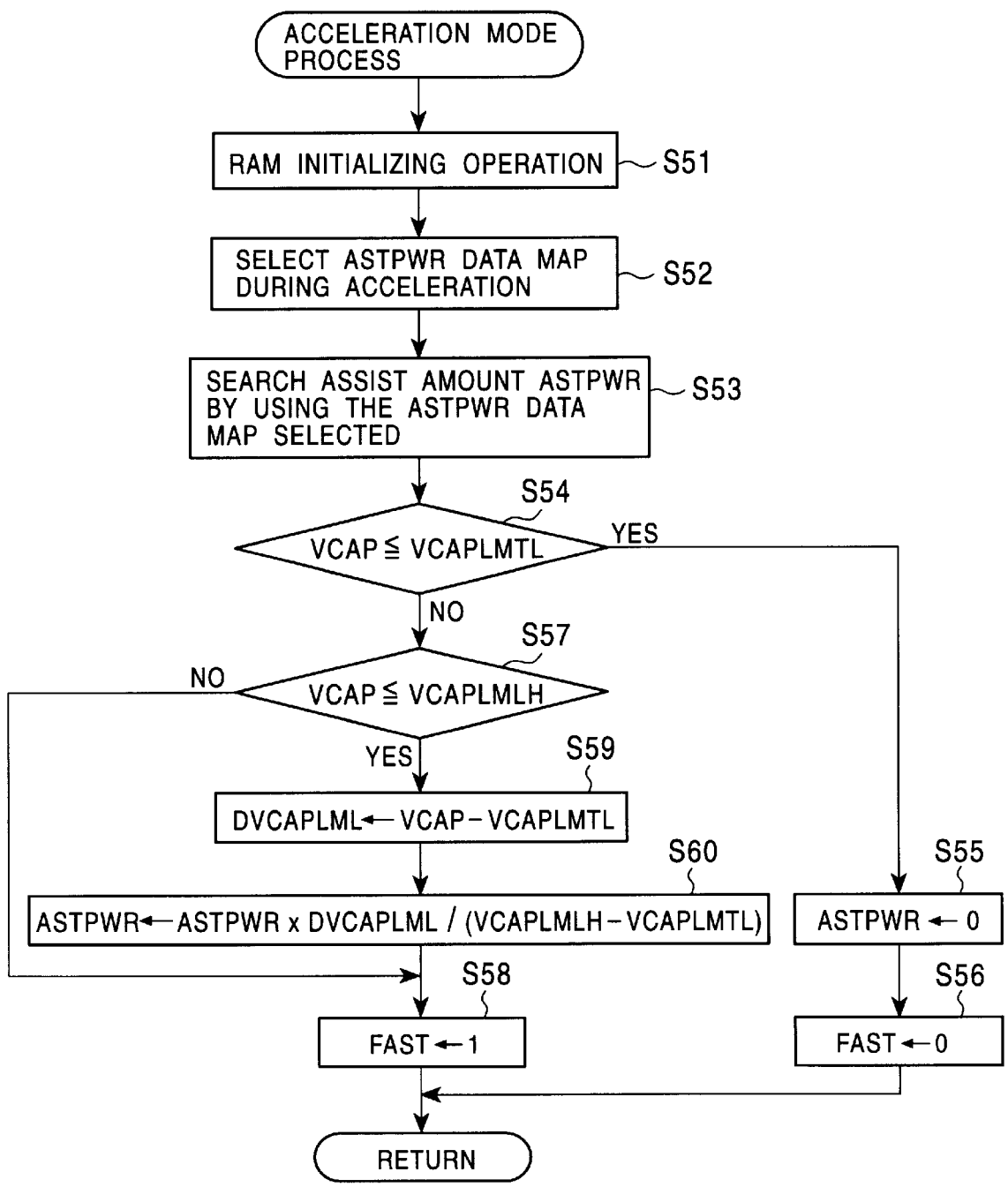
FIG. 8 is a flowchart showing an acceleration mode process.

As shown in FIG. 8, in the acceleration mode process, the CPU 31 first initializes the RAM (step S51). In the initialization operation, for example, values such as the regeneration amount REGEN which have been temporarily stored in the RAM 32 are set to 0. After the initialization, the CPU 31 selects an acceleration ASTPWR data map in accordance with the gear position and air/fuel ratio (step S52), and then searches an assist amount ASTPWR in the map using the acceleration ASTPWR data map selected (step S53). As shown in FIG. 9, assist amounts ASTPWR are previously stored in ROM 33 as acceleration ASTPWR data maps, in a form of ASTPWR#n00 to ASTPWR#n1910, determined in accordance with the engine rotational speeds Ne (NEAST0, NEAST1, . . . ) and throttle valve opening degrees TH (THAST0, THAST1, . . . ). In addition, acceleration ASTPWR data maps are individually provided according to the number of gear positions of the transmission 3 and the target air/fuel ratio of air/fuel ratio control of the mixture supplied to the engine 1 (namely the stoichiometric air/fuel ratio and lean air/fuel ratios which are leaner than the stoichiometric air/fuel ratio). Therefore, an acceleration ASTPWR data map is selected in accordance with the gear positions of the transmission 3 and the target air/fuel ratio, and an assist amount ASTPWR corresponding to the engine rotational speed Ne and the throttle valve opening degree TH at that time is searched in the acceleration ASTPWR data map selected. Each acceleration ASTPWR data map is previously set so as to provide an assist amount ASTPWR suitable for the conditions of gear positions and air/fuel ratios, respectively. Here, the gear positions of the transmission 3 are estimated based on the vehicle speed v and the engine rotational speed Ne, and information regarding the target air/fuel ratio is obtained as a result of the execution of the fuel injection control routine at the ENGECU 12.

After the assist amount ASTPWR has been searched, it is determined whether the current output voltage VCAP of the capacitor 6 is equal to or less than an assist allowable voltage lower limit value VCAPLMTL (for example, 90 V) or not (step S54). If VCAP≦VCAPLMTL, the assist amount ASTPWR is set to 0 (step S55) and the assist flag FAST is reset to a value equal to 0 (step S56).

If it has been determined that VCAP>VCAPLMTL at step S54, it is determined whether the output voltage VCAP of the capacitor 6 is equal to or less than an assist amount subtraction start voltage VCAPLMTH (for example, 100 V) or not (step S57). If VCAP>VCAPLMTH, the assist amount ASTPWR searched in the map is kept as it is, and the assist flag FAST is set to a value equal to 1 (step S58). If VCAP≦VCAPLMTH, that is, if VCAPLMTL<VCAP≦VCAPLMTH, the voltage difference DVCAPLML between the current output voltage VCAP of the capacitor 6 and the assist allowable voltage lower limit value VCAPLMTL is calculated (step S59) and then the assist amount ASTPWR is corrected according to the following equation (step S60), that is, $$ASTPWR=ASTPWR \times DVCAPLML/(VCAPMTH-VCAPLMTL).$$

After the assist amount ASTPWR has been corrected, the assist flag FAST is set to a value equal to 1 at step S56.

Figure 10:
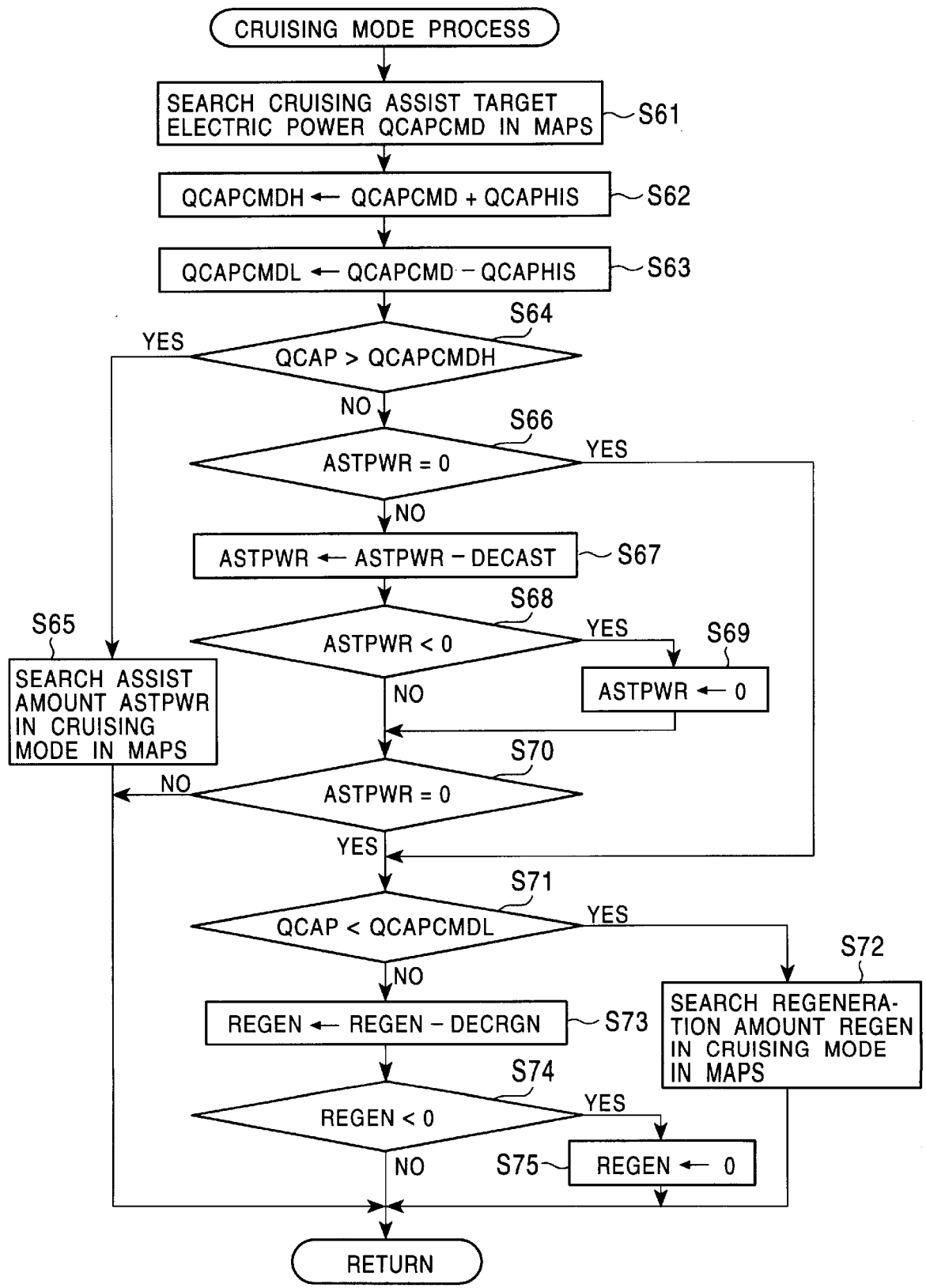
FIG. 10 is a flowchart showing a cruising mode process.

In the cruising mode process, as shown in FIG. 10, the CPU 31 first searches a cruising assist target electric power QCAPCMD in the map (step S61). As shown in FIG. 11, the amounts of cruising assist target electric power QCAPCMD are previously stored in ROM 33 as QCAPCMD data maps, in the form of QCAPCMD #n00 to QCAPCMD #n1910, determined in accordance with the engine rotational speed Ne (NECAST0, NECAST1, . . . ) and the intake pipe pressure PB (PBCAST0, PBCAST1, . . . ). Therefore, the cruising assist target electric power QCAPCMD corresponding to the engine rotational speed Ne and the intake pipe pressure PB at the time is searched in QCAPCMD data maps.

A hysteresis QCAPHIS (for example, 0.05) is added to the cruising assist target electric power QCAPCMD to provide a cruising assist target electric power QCAPCMDH (step S62), and subtracting the hysteresis QCAPHIS from the cruising assist target electric power QCAPCMD provides a cruising assist target electric power QCAPCMDL (step S63).

After step S63 has been performed, the electric power QCAP of the capacitor 6 calculated in the electric power calculation routine which is to be described later is read, and it is determined whether the electric power QCAP is greater than a cruising assist target electric power level QCAPCMDH or not (step S64). If QCAP>QCAPCMDH, the assist amount ASTPWR of the cruising mode is searched in the maps (step S65). In the ROM 33, like the acceleration ASTPWR data map, assist amounts ASTPWR determined according to the engine rotational speed Ne and the throttle valve opening degree TH are previously stored as cruising ASTPWR data maps. Accordingly, the assist amount ASTPWR corresponding to the engine rotational speed Ne and the throttle valve opening degree TH at the time are searched in the cruising ASTPWR data maps.

If QCAP≦QCAPCMDH at step S64, it is determined whether the current assist amount ASTPWR is equal to zero or not (step S66). If ASTPWR is not equal to zero, an assist amount ASTPWR is newly obtained by subtracting a predetermined amount DECAST (for example, 0.1 kW) from the assist amount ASTPWR (step S67), and it is determined whether the assist amount ASTPWR is smaller than zero (step S68). If ASTPWR is<0, the assist amount ASTPWR is set to zero (step S69), and CPU 31 proceeds to step S70. If ASTPWR ≧0, it proceeds to step S70 as it is. It is determined whether the assist amount ASTPWR is equal to zero or not at step S70. If ASTPWR=0, it is determined whether the electric power QCAP of the capacitor 6 is smaller than a cruising assist target electric power level QCAPCMDL or not (step S71). If QCAP<QCAPCMDL, a regeneration amount REGEN in the cruising mode is searched in the maps (step S72). In the ROM 33, regeneration amounts REGEN in the cruising mode determined according to the engine rotational speed Ne and the intake pipe pressure PB are previously stored as cruising REGEN data maps. Accordingly, a regeneration amount REGEN corresponding to the engine rotational speed Ne and the intake pipe pressure PB at the time is searched in the cruising REGEN data maps.

If QCAP≧QCAPCMDL at step S71, a regeneration amount REGEN is newly obtained by subtracting a predetermined amount DECRGN (for example, 0.1 kW) from the regeneration amount REGEN (step S73), and it is determined whether the regeneration amount REGEN is smaller than zero or not (step S74). If REGEN<0, the regeneration amount REGEN is set to zero (step S75).

Figure 12:
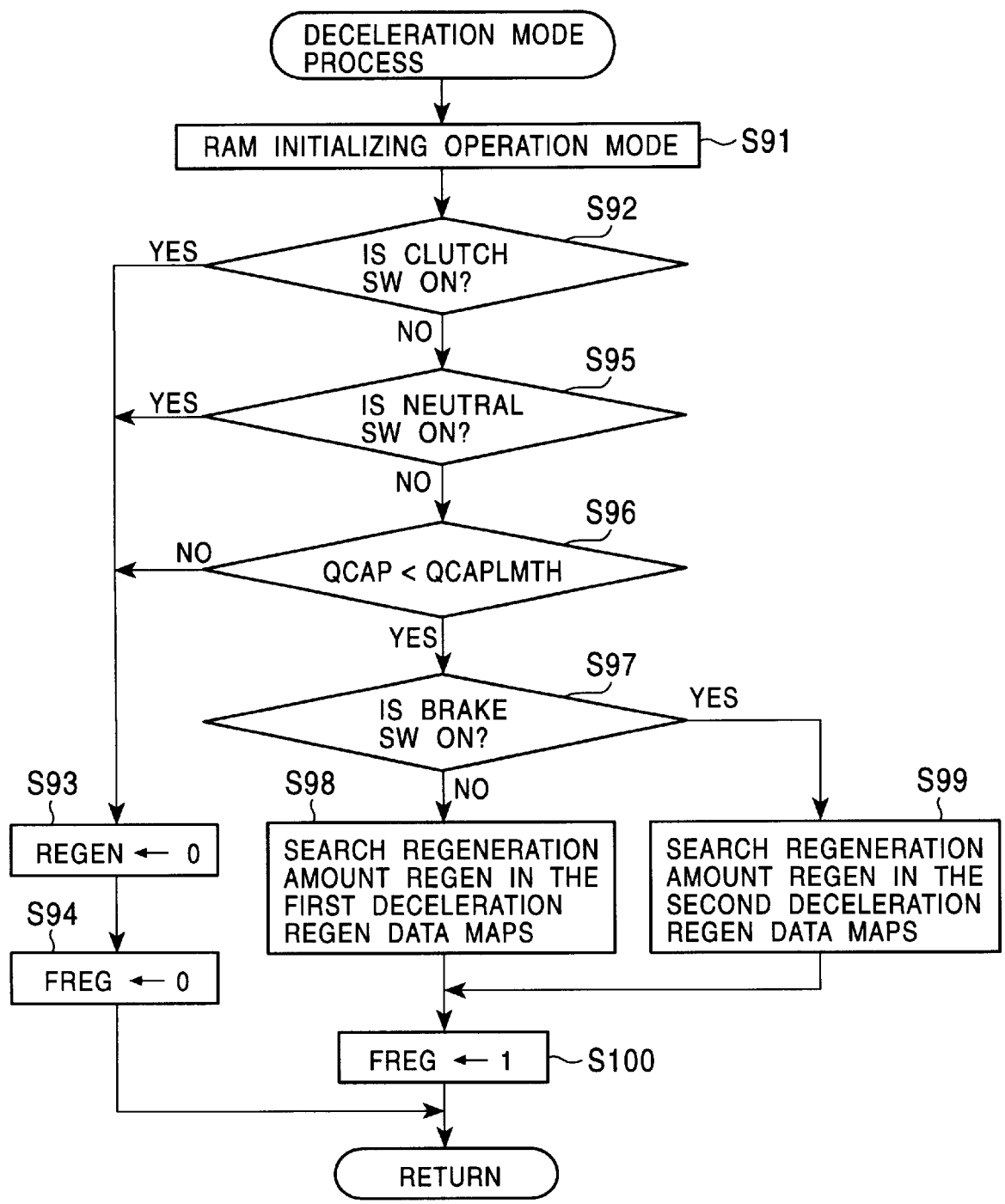
FIG. 12 is a flowchart showing a deceleration mode process.

In the deceleration mode process, as shown in FIG. 12, the CPU 31 first initializes the RAM (step S91). In the initialization operation, for example, values such as assist amounts ASTPWR which have been temporarily stored in the RAM 32 are set to zero. After the initialization, the CPU 31 reads the on/off states of the clutch switch 43 to determine whether the clutch is transmitting power or not (step S92). If the clutch switch 43 has been turned on, and since the clutch is in a power cut-off state, the regeneration amount REGEN is set to 0 (step S93) and the regeneration flag FREG is reset to a value equal to 0 (step S94).

If the clutch switch 43 is off, since the clutch is transmitting power, then the CPU31 reads the on/off states of the neutral switch 44 to determine whether the transmission 3 is in a neutral condition or not (step S95). If the transmission is in a neutral condition because of the on status of the neutral switch 44, the CPU 31 proceeds to step S93 to set the regeneration amount REGEN to zero.

If the transmission is in an in-gear condition due to the off status of the neutral switch 44, the electric power QCAP of the capacitor 6 calculated in the electric power calculation routine is read to determine whether the electric power QCAP is greater than an upper limit threshold value QCAPLMTH or not (step S96). The upper limit QCAPLMTH may be set to, for example, approximately 90% of the electric power of the fully charged capacitor 6, which is chargeable by regeneration, and thus can be appropriately set in accordance with the capacity of the capacitor 6. In addition, the upper limit threshold QCAPLMTH is revised upward as the capacitor deterioration rate DCAP which is calculated at step S71 is larger. The revision is carried out within the capacitance of the capacitor 6 fully charged. If QCAP≧QCAPLMTH, the CPU 31 proceeds to step S93 to set the regeneration amount REGEN to zero. On the other hand, if QCAP<QCAPLMTH, the on/off states of the brake switch 45 are read to determine whether the braking pedal has been depressed to allow the brake condition or not (step S97). If the brake switch 45 is off to allow a non-braking condition, the regeneration amount REGEN is determined by searching the first deceleration REGEN map (step S98). If the brake switch 45 is on to allow the braking condition, the regeneration amount REGEN is determined by searching the second deceleration REGEN map (step S99). As shown in FIG. 13, regeneration amounts REGEN at the time of non-braking are previously stored in ROM 33 as the first deceleration REGEN data map, in a form of REGEN#n00 to REGEN#n1910, determined in accordance with the engine rotational speed Ne (NERGN0, NERGN1, . . . ) and the intake pipe pressure PB (PBRGN0, PBRGEN1, . . . ) Moreover, as shown in FIG. 14, regeneration amounts REGEN at the time of braking are previously stored in ROM 33 as the second deceleration REGEN data map, in a form of REGENBR#n00 to REGENBR#n1910, determined in accordance with the engine rotational speed Ne (NERGN0, NERGN1, . . . ) and the intake pipe pressure PB (PBRGN0, PBRGN1, . . . ). Accordingly, the regeneration amount REGEN corresponding to the engine rotational speed Ne and the intake pipe pressure PB at the time is searched in the first or second deceleration REGEN data maps.

After step S98 or S99 has been executed, the regeneration flag FREG is set to a value of 1 (step S100).

A slope estimate routine which allows for estimating the slope SLP used at step S31 in the aforementioned acceleration mode trigger table retrieval routine will be explained below with reference to FIG. 15 through FIG. 18 and FIG. 20.

Figure 15:
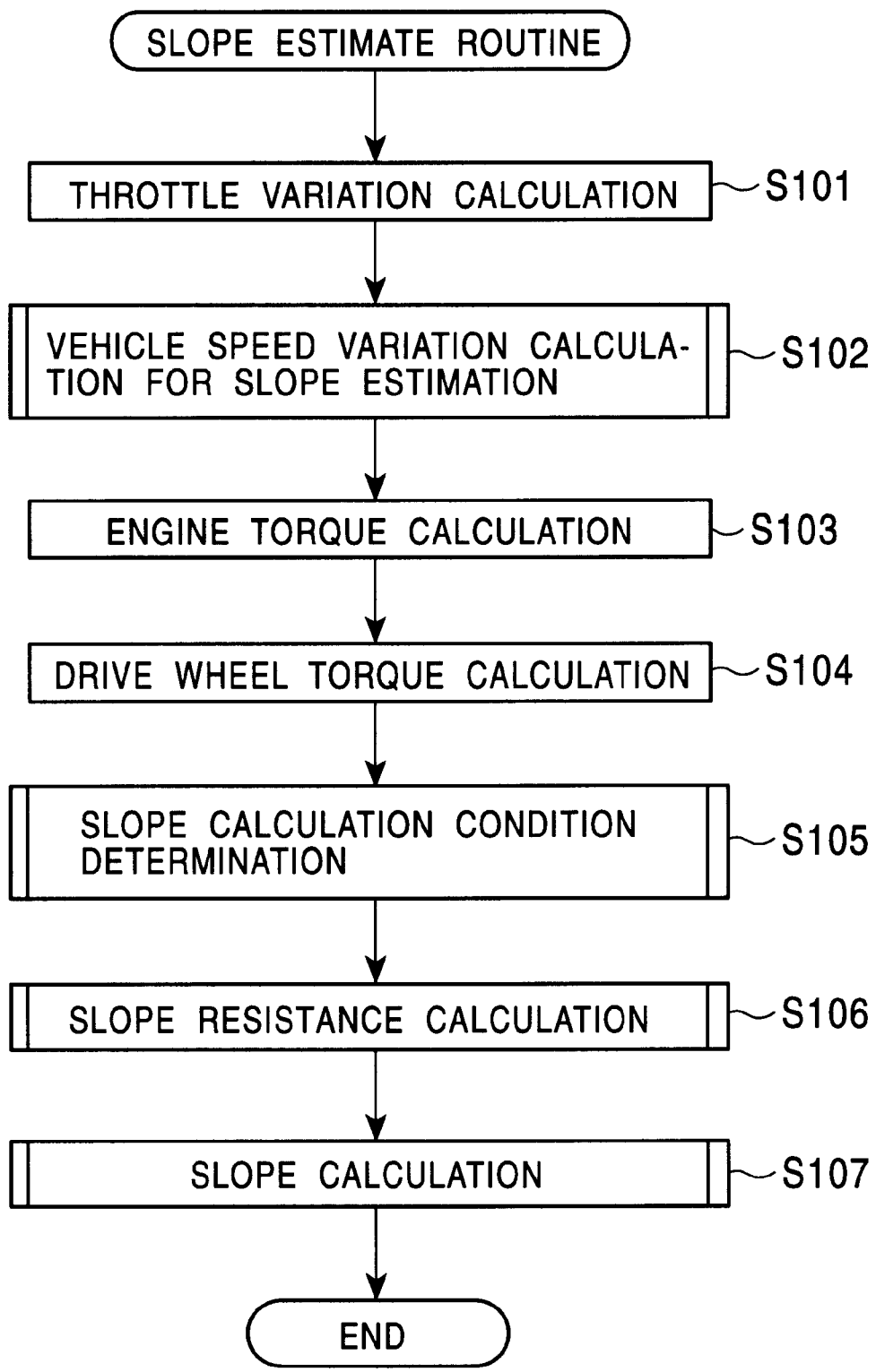
FIG. 15 is a flowchart showing a slope estimate routine.
Figure 16:
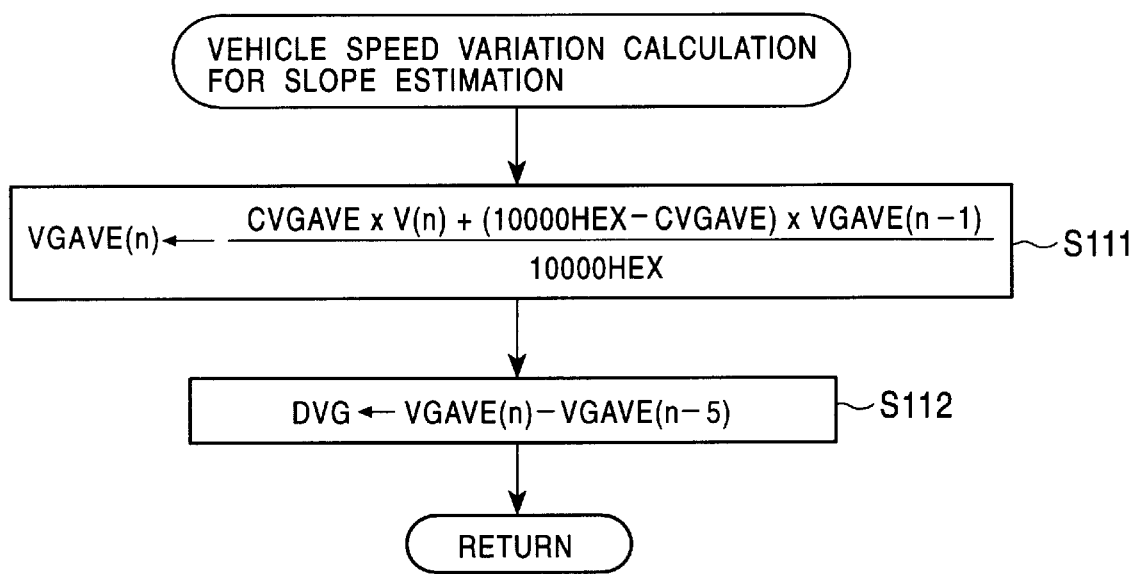
FIG. 16 is a flowchart showing a vehicle speed variation calculation routine for slope estimation.

As shown in FIG. 15, in the slope estimate routine, the CPU 31 first calculates the variation DTH of the throttle valve 50 in accordance with the throttle valve opening degree TH (step S101). As explained at step S9 in the foregoing, the throttle valve opening degree variation DTH is calculated as the difference between the current and previous values of the throttle valve opening degree TH detected for each unit of time by means of the throttle valve opening degree sensor 54. After step S101 has been executed, a vehicle speed variation DVG for slope estimate is calculated (step S102). Specifically, as shown in FIG. 16, in calculation of the vehicle speed variation DVG for slope estimate, the current vehicle speed estimate calculation value VGAVE is calculated in accordance with the vehicle speed V detected by means of the vehicle speed sensor 55 and a vehicle speed variation calculation average coefficient CVGAVE for slope estimate (step S111) and the current present vehicle speed average calculation value VGAVE (n) is subtracted by the present vehicle speed average calculation value VGAVE (n–5) provided five loops previously (step S112), whereby the vehicle speed variation DVG for slope estimate is calculated.

Figure 17:
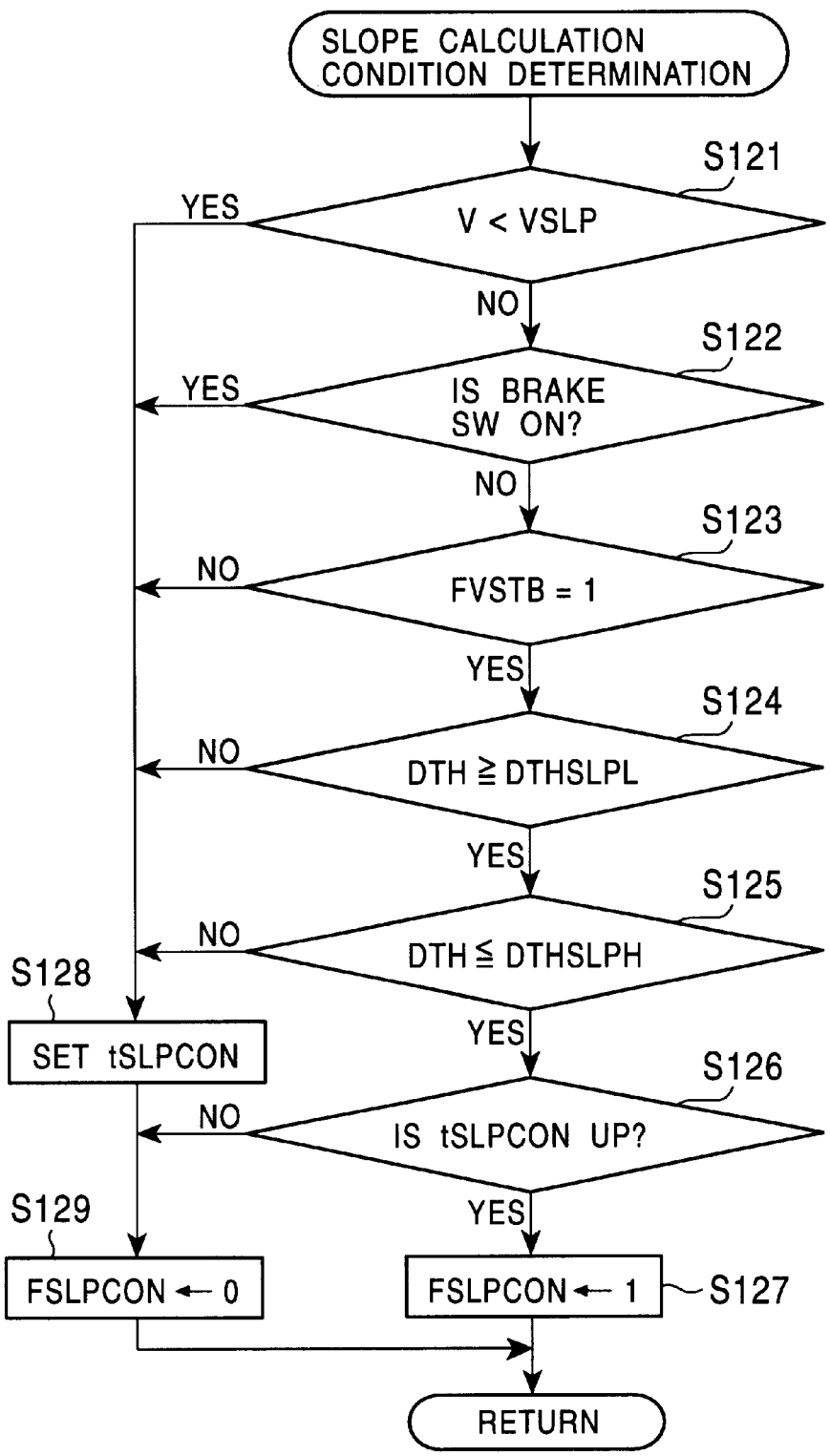
FIG. 17 is a flowchart showing a slope calculation condition determination routine.

After the vehicle speed variation DVG for slope estimate has been calculated, engine torque TEACT is searched in the engine torque retrieval map stored previously in the ROM 33 with the engine rotational speed Ne and the intake pipe pressure PB as the parameters (step S103). Then, drive wheel torque TDSACT is calculated by the following equation in accordance with the engine torque TEACT, the overall gear ratio IGEAR, and the transmission efficiency EMT of the transmission 3 (step S104), that is, $TDSACT = TEACT \times IGEAR \times EMT \times 8000HEX.$ After the drive wheel torque TDSACT has been calculated, then the slope calculation conditions are determined (step S105). Specifically, in the determination of the slope calculation conditions, as shown in FIG. 17, it is determined whether the vehicle speed V is less than a slope calculation vehicle speed lower limit value VSLP or not (step S121). If V<VSLP, a predetermined period (for example, 3 sec) is set to a slope calculation condition stability waiting timer tSLPCON to start time measurement (step S128) and a slope calculation condition establishment flag FSLPCON is reset to zero (step S129).

If V≧VSLP at step S121, it is determined whether the brake switch 45 has been turned on or not (step S122). If the brake switch 45 has been turned on, the CPU 31 proceeds to steps S128 and S129. If the brake switch 45 is off, it is determined whether a vehicle speed variation small flag FVSTB is equal to 1 or not (step S123).

If FVSTB=0, the CPU 31 proceeds to steps S128 and S129. if FVSTB=1, then it is determined whether the variation DTH of the throttle valve 50 calculated at step S101 is equal to or greater then the lower limit value DTHSLPL or not (step S124). If DTH≧DTHSLPL, then it is determined whether the variation DTH is equal to or less than an upper limit value DTHSLPH or not (step S125).

If DTH<DTHSLPL or DTH>DTHSLPH, the CPU 31 proceeds to steps S128 and S129. If DTH≦DTHSLPH, it is determined whether the slope calculation condition stability waiting timer tSLPCON has finished the time measurement or not (step S126). If not, the CPU 31 proceeds to step S129.

If true, it is determined that the conditions for executing slope calculation have been established, the slope calculation condition establishment flag FSLPCON is set to 1 (step S127). The vehicle speed variation small flag FVSTB at step S123 is set to 1 when the vehicle speed variation DVG for slope estimate calculated at step S102 is equal to or less than a predetermined value.

As mentioned above, after determination results for slope calculation limit conditions have been provided in accordance with the value of the slope calculation condition establishment flag FSLPCON, a slope resistance TSLP is calculated (step S106).

Figure 18:
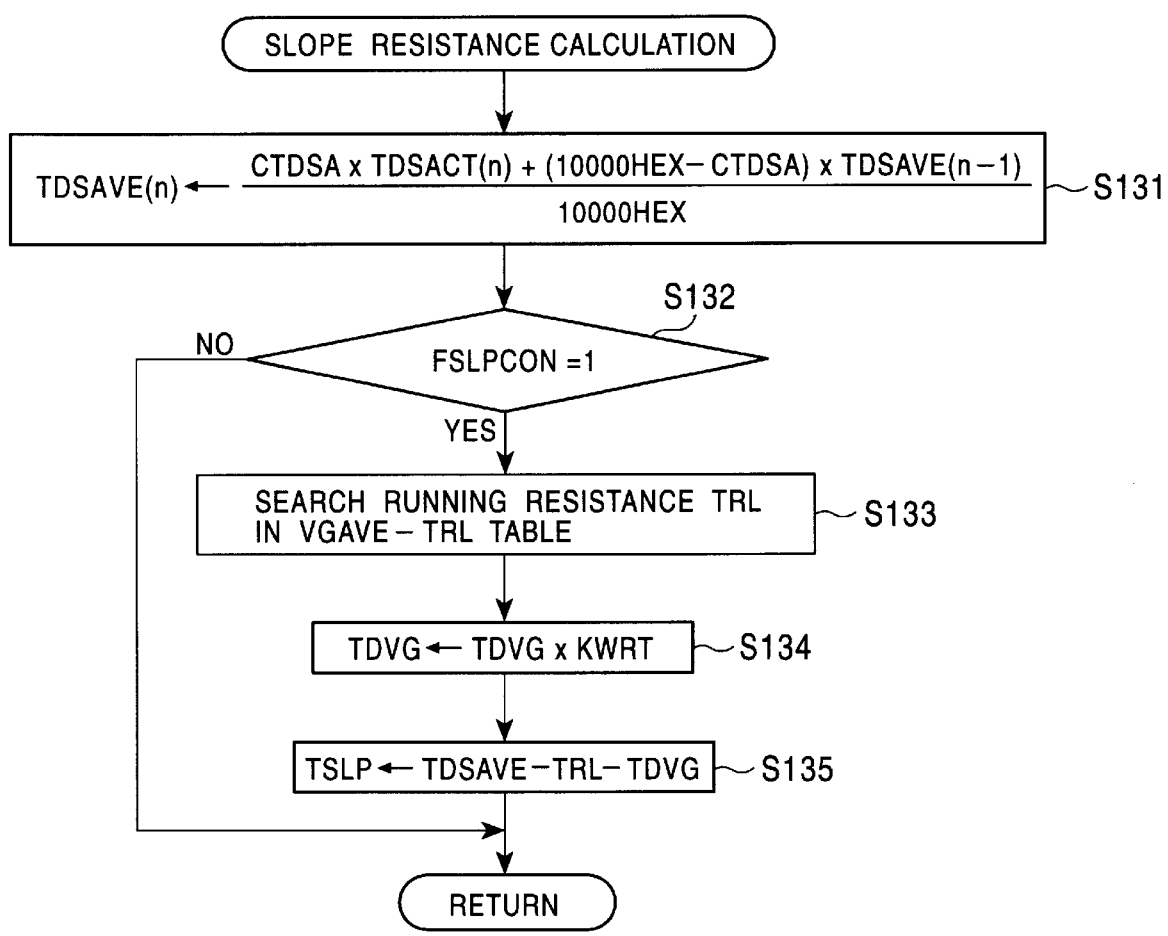
FIG. 18 is a flowchart showing a slope resistance calculation routine.
Figure 19:
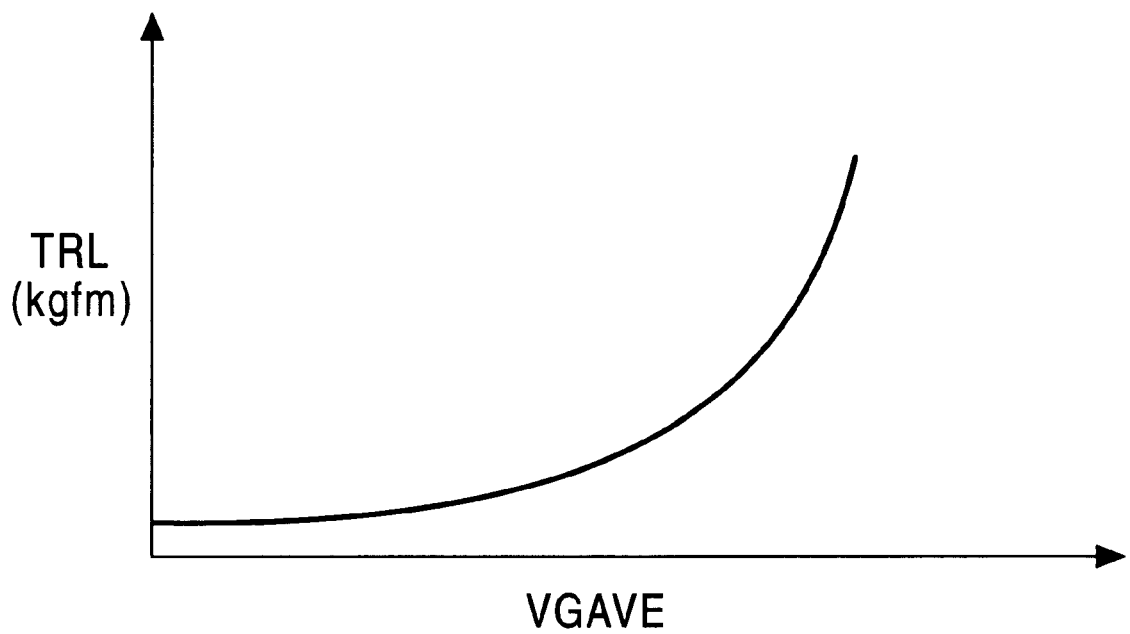
FIG. 19 is a view showing a VGAVE-TRL characteristic.

As shown in FIG. 18, in the calculation of the slope resistance TSLP, a drive wheel torque average calculation value TDSAVE (n) is first calculated in response to the drive wheel torque TDSACT calculated at step S104 and the drive wheel torque average coefficient CTDSA for slope resistance calculation (step S131) to determine whether the aforementioned slope calculation condition establishment flag FSLPCON is equal to 1 or not (step S132). If FSLPCON is equal to 1, a running resistance TRL is searched in a VGAVE-TRL table with the present vehicle average calculation value VGAVE calculated at step S111 as the parameters (step S133). The VGAVE-TRL table is previously stored in ROM 33, and between the present vehicle average calculation value VGAVE and the running resistance TRL in the table have the relationship shown in FIG. 19. The running resistance TRL which is the sum of an air resistance and a rolling resistance increases as the present vehicle average calculation value VGAVE increases.

After step S133 has been performed, the acceleration resistance TDVG is calculated by multiplying the vehicle speed variation DVG for slope estimate calculated at step S112 by an acceleration resistance calculation variable KWRT which takes weight and tire radius into account (step S134). The slope resistance TSLP is calculated by subtracting the running resistance TRL and acceleration resistance TDVG from the drive wheel torque average calculation value TDSAVE (step S135).

Figure 20:
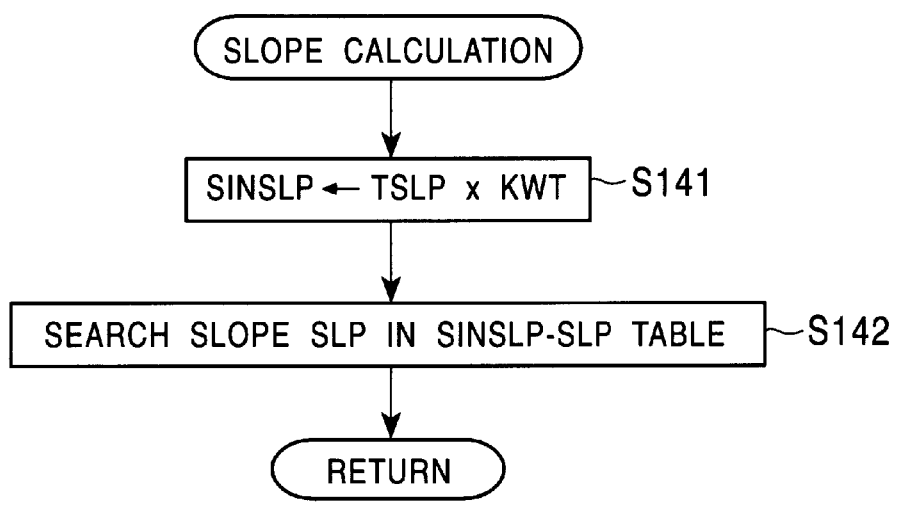
FIG. 20 is a flowchart showing a slope calculation routine.
Figure 21:
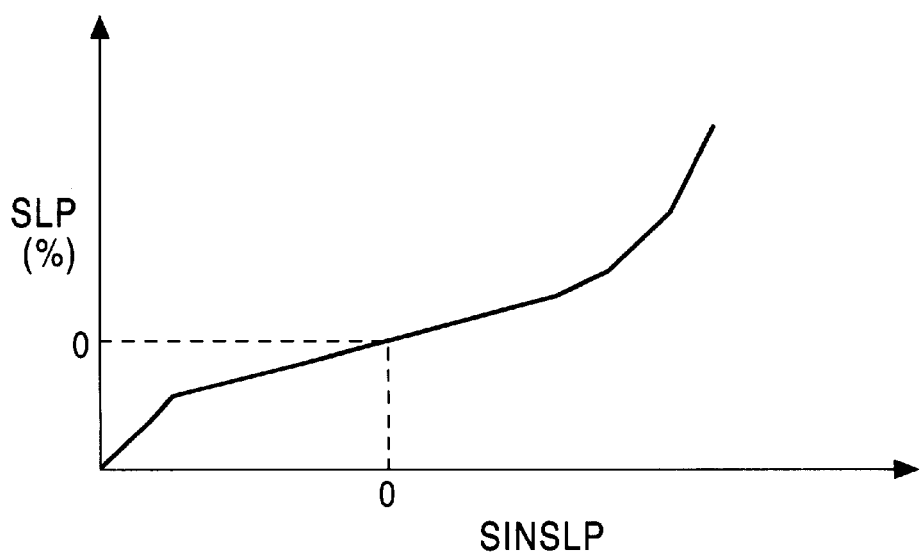
FIG. 21 is a view showing a SINSLP-SLP characteristic.

After the slope resistance TSLP has been calculated as mentioned above, then a slope SLP is calculated (step S107). Specifically, as shown in FIG. 20, in the calculation of the slope SLP, a slope sine value SINSLP is first calculated by multiplying the slope resistance TSLP by a slope calculation variable KWT (for example, 1/335.942) (step S141). The slope calculation variable KWT is the inverse of the weight× tire radius. After the slope sine value SINSLP has been calculated, the slope SLP (a value in %) corresponding to the slope sine value SINSLP is searched in a SINSLP-SLP table (step S142). The SINSLP-SLP table is previously stored in the ROM 33, and between the slope sine value SINSLP and the slope SLP in the table have a relationship as shown in FIG. 21.

Figure 22:
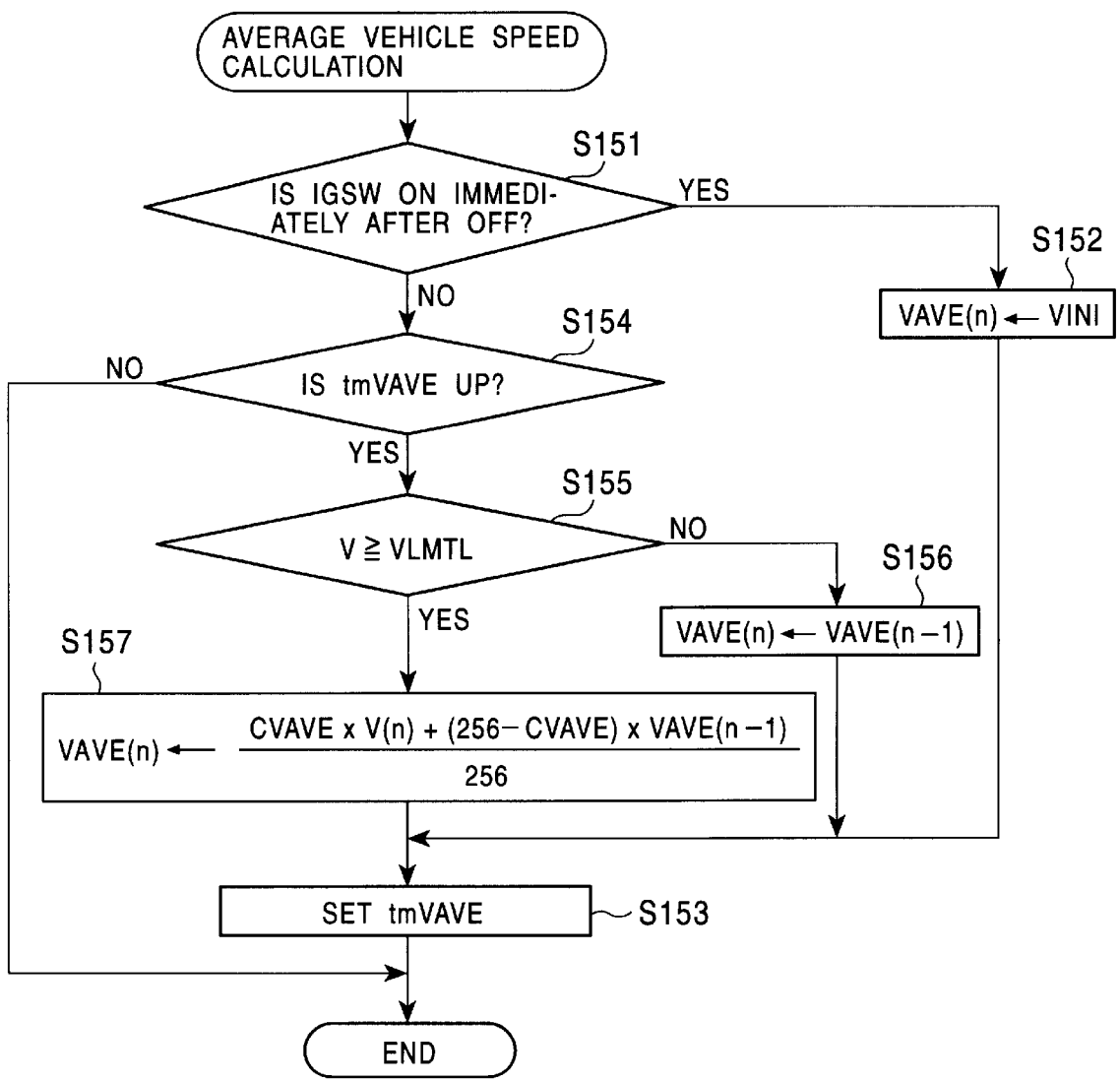
FIG. 22 is a flowchart showing an average vehicle speed calculation routine.

The calculation method of the average vehicle speed VAVE used in step S33 will be explained below. As shown in FIG. 22, the CPU 31 determines whether the ignition switch 46 is in the condition immediately after the switch 46 has been switched over from off to on or not (step S151). A current average vehicle speed VAVE (n) is set to a value equal to an initial value VINI (for example, 36 km/h) (step S152) and a predetermined period (for example, 1 sec) is set to a VAVE calculation delay timer tmVAVE to start time measurement (step S153).

If the ignition switch 46 is not in the condition immediately after the switch has been switched over from off to on at step S151, it is determined whether the VAVE calculation delay timer tmVAVE has completed the time measurement of the predetermined period and reached zero or not (step S154). If the VAVE calculation delay timer tmVAVE has completed the time measurement and reached zero, it is determined whether the vehicle speed V is equal to or greater than a running lower limit speed VLMTL (for example, 2 km/h) or not (step S155). If V<VLMTL, a previous average vehicle speed VAVE (n−1) is determined to be the current average vehicle speed VAVE (n) (step S156). If V≧VLMTL, the current average vehicle speed VAVE (n) is calculated in accordance with a current vehicle speed V (n), the previous average vehicle speed VAVE (n−1), and a VAVE calculation average coefficient CVAVE (for example, 1/64) (step S157). After step S156 or S157 has been executed, the VAVE calculation delay timer tmVAVE is set at step S153.

Figure 23:
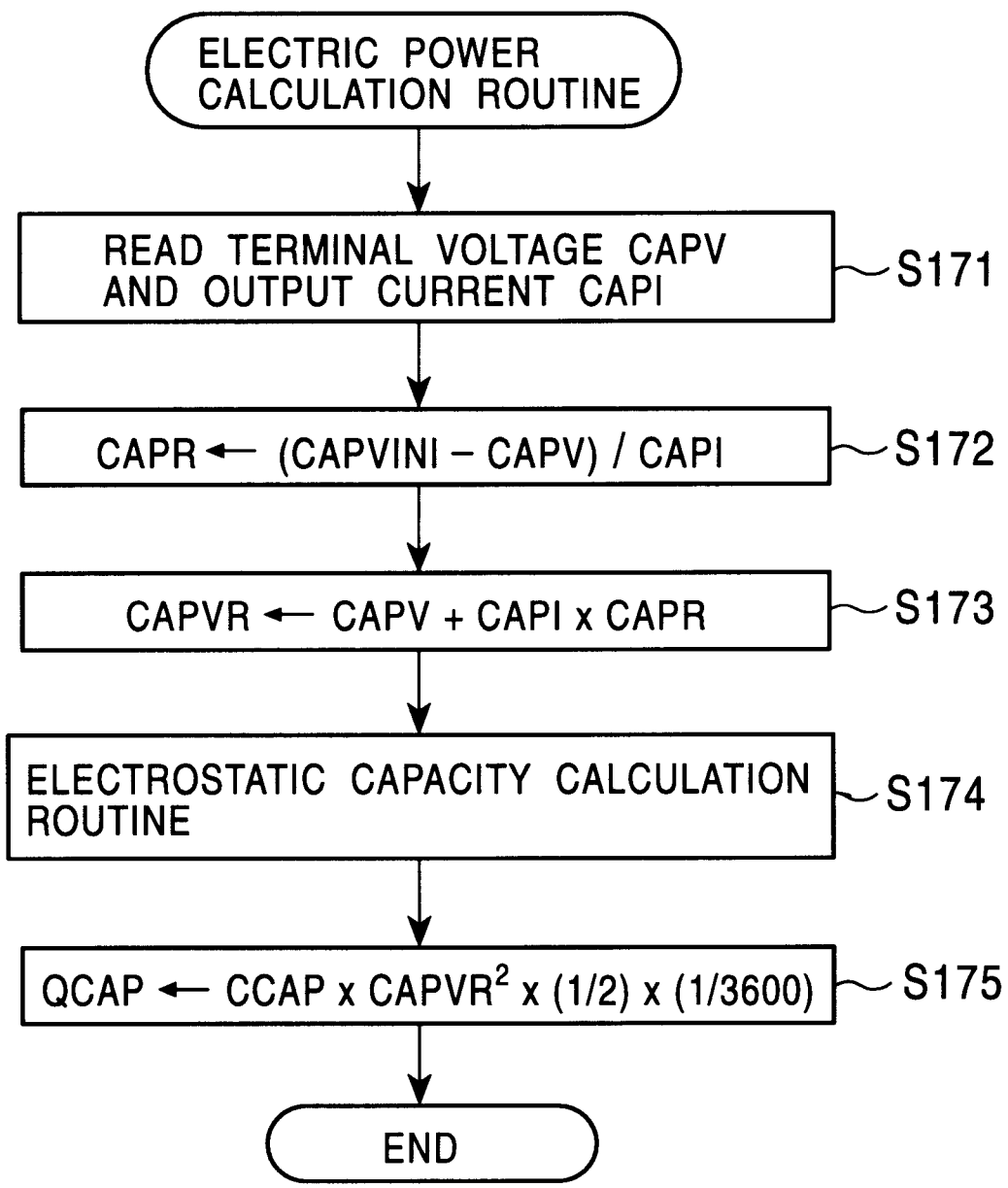
FIG. 23 is a flowchart showing an electric power calculation routine.

The electric power calculation routine described in the cruising mode process of FIG. 10 will be explained below. As shown in FIG. 23, in the electric power calculation routine, the CPU 31 reads the output voltage CAPV and output current CAPI of the capacitor 6 (step S171) and then the internal resistance CAPR of the capacitor 6 is calculated in response to the read voltage CAPV, the read current CAPI, and an initial voltage CAPVIN (step S172). The calculation equation for the internal resistance CAPR is as follows. That is, $$CAPR=(CAPVINI-CAPV)/CAPI.$$

After the internal resistance CAPR has been calculated, the storage voltage CAPVR of the capacitor 6 which takes the internal resistance CAPR into account is calculated by using the read voltage CAPV, the read current CAPI, and the internal resistance CAPR (step S173). The calculation equation for the storage voltage CAPVR is as follows. That is, $$CAPVR=CAPV+CAPI \times CAPR.$$

After step S173 has been executed, an electrostatic capacity calculation routine is executed in order to calculate the electrostatic capacity CCAP of the capacitor 6 (step S174). The electrostatic capacity calculation routine will be described later. After the electrostatic capacity CCAP has been calculated in the electrostatic capacity calculation routine, an electric power QCAP is calculated using the electrostatic capacity CCAP and the storage voltage CAPVR (step S175). The calculation equation for the electric power QCAP is as follows. That is, $$QCAP=CCAP \times CAPVR^2 \times (\frac{1}{2}) \times (1/3600).$$

Figure 24:
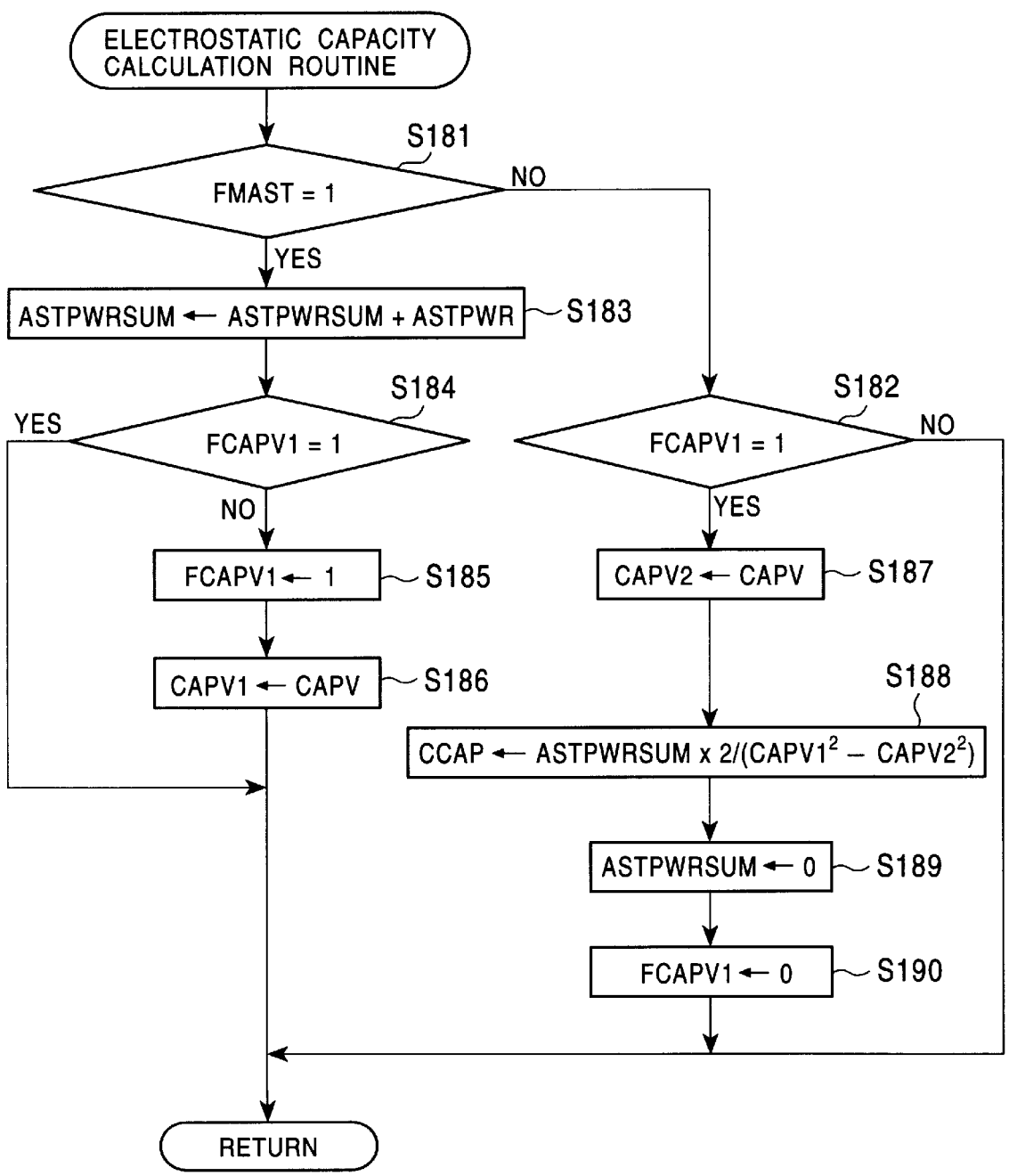
FIG. 24 is a flowchart showing an electrostatic capacity calculation routine.

As shown in FIG. 24, in the electrostatic capacity calculation routine, the CPU 31 first determines whether the acceleration flag FMAST is equal to 1 or not (step S181). If FMAST=0, it is determined whether an electrostatic capacity calculation flag FCAPV1 is equal to 1 or not (step S182). The electrostatic capacity calculation flag FCAPV1 is set to 1 when calculation of a total assist amount (accumulated electric power drive) ASTPWRSUM is started to calculate the electrostatic capacity. If FCAPV1=0, the electrostatic capacity calculation routine is ended.

If it was determined that FMAST=1 at step S181 to be accelerated, since the mode was the acceleration mode, a total assist amount ASTPWRSUM is newly calculated by adding the assist amount ASTPWR to the total assist amount ASTPWRSUM (step S183) at that time. Then, it is determined whether an electrostatic capacity calculation flag FCAPV1 is equal to 0 or not (step S184). If FCAPV1=0, the electrostatic capacity calculation flag FCAPV1 is set to 1 (step S185). The terminal voltage CAPV of the capacitor 6 at that time is held as a starting voltage CAPV1 (step S186) and then the routine is ended. If FCAPV1=1, since steps S185 and S186 have been executed, the routine is immediately ended.

If it is determined that FCAPV1=1 at step S182, that is, if the operating condition is immediately after an acceleration mode process has been completed, the terminal voltage CAPV of the capacitor 6 is held as an end voltage CAPV2 (step S187), and then the electrostatic capacity CCAP is calculated by using the total assist amount ASTPWRSUM which shows the power consumption of the capacitor 6 during the acceleration mode process, the starting voltage CAPV1, and end voltage CAPV2 (step S188). The equation for calculating the electrostatic capacity CCAP is as follows. That is, $$CCAP=ASTPWRSUM \times 2/(CAPV1^2 - CAPV2^2).$$

After the electrostatic capacity CCAP has been calculated, the total assist amount ASTPWRSUM is equal to 0 (step S189) and the electrostatic capacity calculation flag FCAPV1 is reset to make it equal to zero (step S190).

Figure 25:
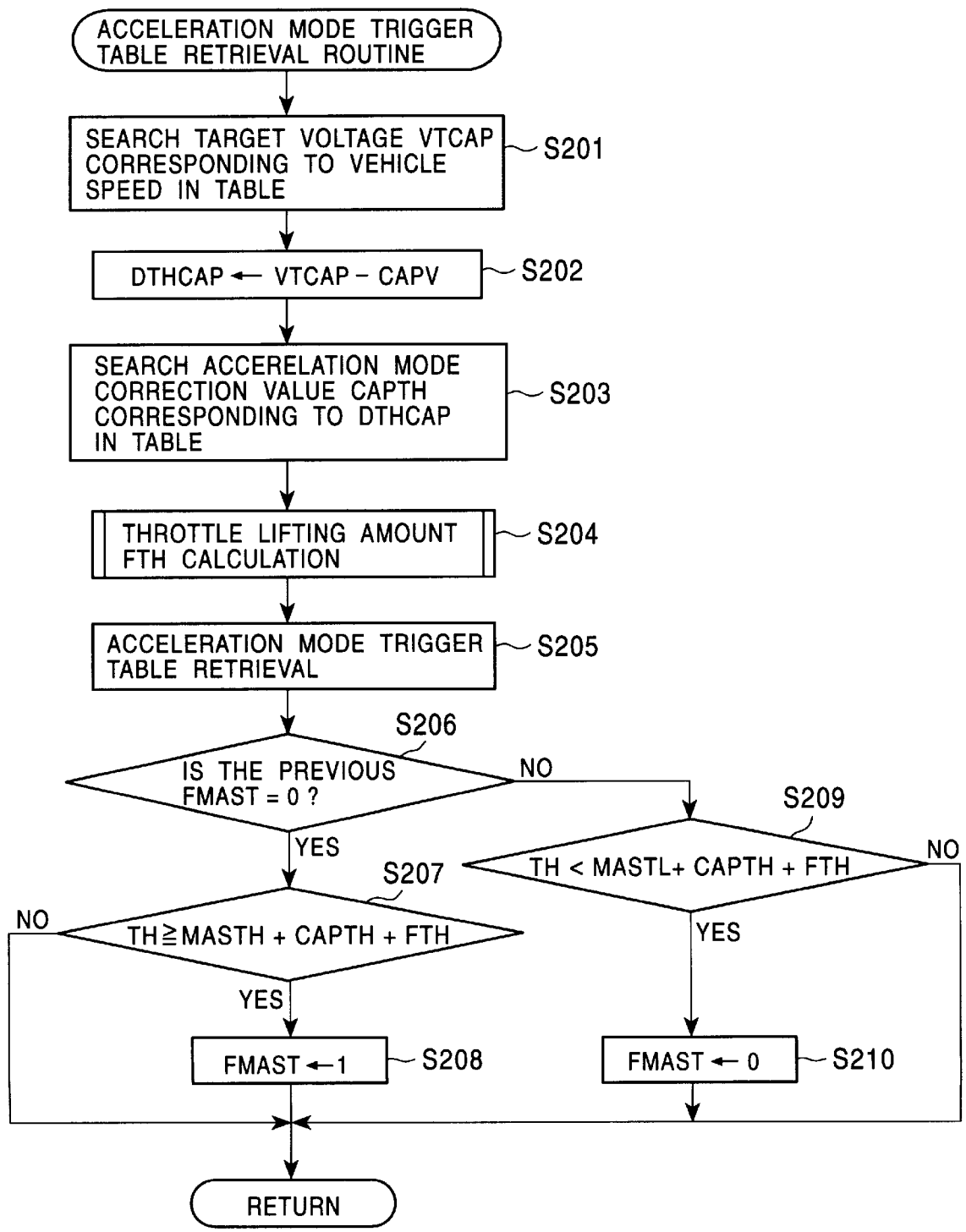
FIG. 25 is a flowchart showing an acceleration mode trigger table retrieval routine.
Figure 26:
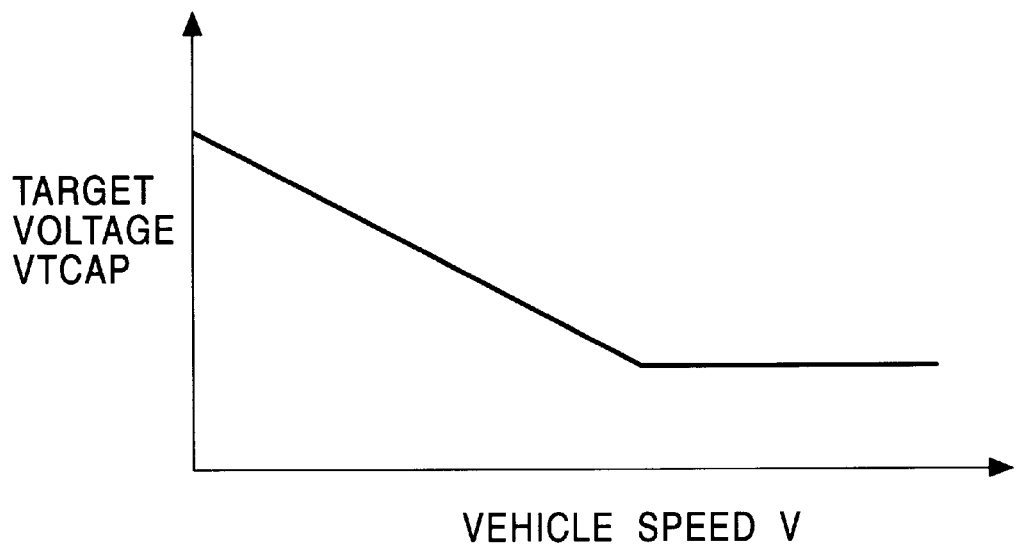
FIG. 26 is a view showing a V-VTCAP characteristic.

FIG. 25 shows another example of the acceleration mode trigger table retrieval routine. In this acceleration mode trigger table retrieval routine, the CPU 31 first searches a target voltage VTCAP corresponding to the vehicle speed V in a V-VTCAP table (step S201). Since the V-VTCAP table having a V-VTCAP characteristic shown in FIG. 26 is previously stored in the ROM 33, the target voltage VTCAP corresponding to the vehicle speed V is searched in the V-VTCAP table.

Figure 27:
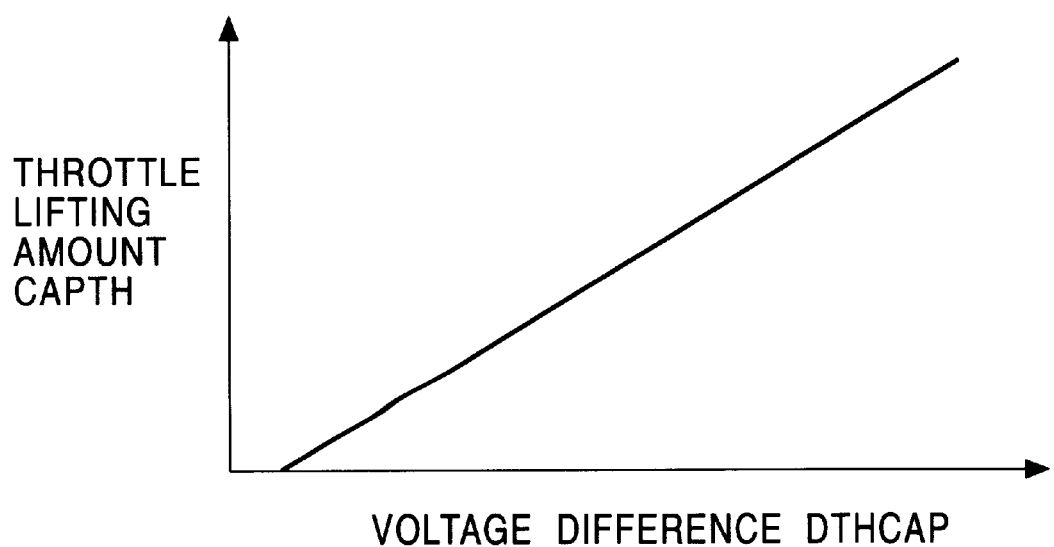
FIG. 27 is a view showing a DTHCAP-CAPTH characteristic.

After the target voltage VTCAP has been determined, the voltage difference between the target voltage VTCAP and the output voltage CAPV of the capacitor 6 is determined to be DTHCAP (step S202) and then a correction value CAPTH corresponding to the voltage difference DTHCAP is searched in a DTHCAP-CAPTH table (step S203). The correction value CAPTH is an additional value for correcting threshold values MASTH and MASTL. Since the DTHCAP-CAPTH table having a DTHCAP-CAPTH characteristic shown in FIG. 27 is previously stored in the ROM 33, the correction value CAPTH corresponding to the voltage difference DTHCAP is executed to search in the DTHCAP-CAPTH table.

After step S203 has been executed, a throttle lifting amount FTH corresponding to the load variation of the engine 1 is calculated (step S204). The calculation of the throttle lifting amount FTH will be described later. After the throttle lifting amount FTH has been obtained, the acceleration flag FMAST is searched and set in the acceleration mode trigger table in response to the engine rotational speed Ne and the throttle valve opening degree TH (step S205). The table search of the acceleration flag FMAST is the same as step S43 mentioned above.

After the acceleration flag FMAST has been searched in the acceleration mode trigger table, it is determined whether the previous acceleration flag FMAST is equal to 0 or not (step S206). If the previous FMAST=0, to determine whether the current acceleration flag FMAST is equal to 1 or not, the acceleration mode start threshold value MASTH in the acceleration mode trigger table corresponding to the present engine rotational speed Ne is increased by the correction value CAPTH plus the throttle lifting amount FTH, and is then compared with the throttle valve opening degree TH (step S207). If TH≧MASTH+CAPTH+FTH, the acceleration flag FMAST is set to 1 (step S208). If TH<MASTH+CAPTH+FTH, it is maintained as it is whereby FMAST=0.

If it is determined that the previous FMAST=1 at step S206, to determine whether the current acceleration flag FMAST is equal to 0 or not, the acceleration mode end threshold value MASTL in the acceleration mode trigger table corresponding to the present engine rotational speed Ne is increased by the correction value CAPTH+throttle lifting amount FTH, and is then compared with the throttle valve opening degree TH (step S209). If TH<MASTL+CAPTH+FTH, the acceleration flag FMAST is set to 0 (step S210). If TH≧MASTL+CAPTH+FTH, it is maintained as it is whereby FMAST=1.

Figure 28:
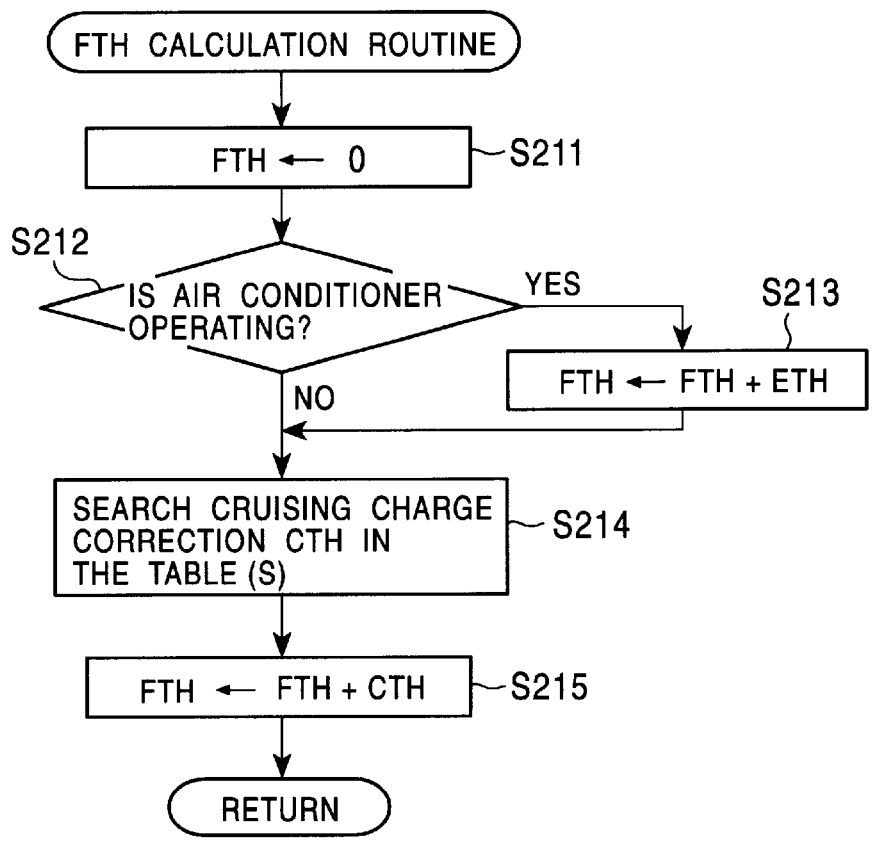
FIG. 28 is a flowchart showing an FTH calculation routine.

In the calculation routine of the throttle lifting amount FTH, as shown in FIG. 28, the CPU 31 first sets the throttle lifting amount FTH to 0 (step S211) to determine whether a vehicle-mounted air conditioner (not shown) is activated or not (step S212). If the vehicle-mounted air conditioner is operating, an air conditioner throttle correction ETH is added to the throttle lifting amount FTH (step S213). Although the air conditioner throttle correction ETH is a fixed value, it may be set according to operating conditions of the air conditioner such as the power consumption.

Figure 29:
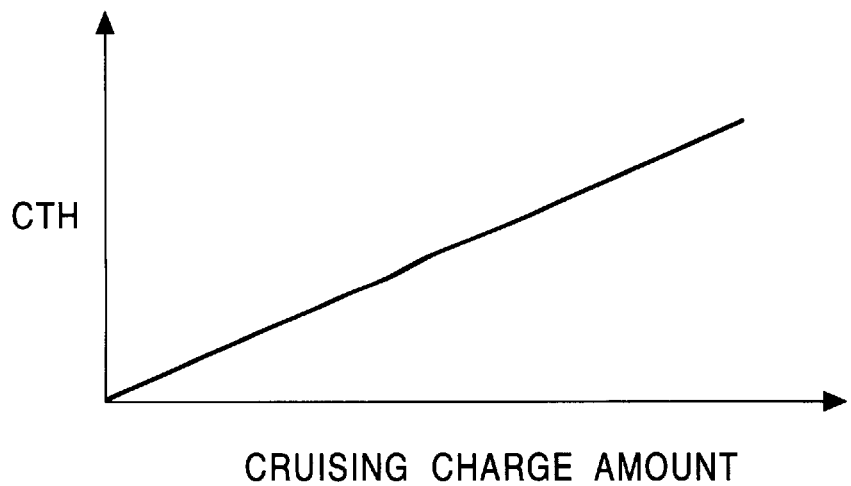
FIG. 29 is a view showing a cruising charge—CTH characteristic.

If the vehicle mounted air conditioner is not operating, or after step S213 has been executed with the vehicle mounted air conditioner in operation, a cruising charge correction CTH corresponding to a cruising charge amount which is a value of the regeneration amount REGEN during the cruising mode period is searched in a table (step S214). The cruising charge amount is obtained as the regeneration amount REGEN at steps S72 through S75 mentioned above. Since the cruising charge amount—CAPTH table having a cruising charge amount—CTH characteristic shown in FIG. 29 is previously stored in the ROM 33, the cruising charge correction CTH corresponding to the cruising charge amount is executed to search in the cruising charge amount—CAPTH table. After the cruising charge amount— CTH has been searched, a throttle lifting amount FTH is newly calculated by adding the cruising charge correction CTH to the throttle lifting amount FTH (step S215).

In the aforementioned embodiment, the case where the present invention is applied to an internal combustion engine having a manual transmission has been explained, however, the present invention can be applied to an internal combustion engine having an automatic transmission (including a non-stage continuously variable transmission). In the automatic transmission, determination of mode switching between the acceleration mode and cruising mode may be performed in accordance with the vehicle speed and throttle valve opening degree. In this case, the acceleration mode is determined when the throttle valve opening degree has exceeded the acceleration mode start threshold value corresponding to the vehicle speed, and the cruising mode is executed to determine when the throttle valve opening degree has fallen below the acceleration mode end threshold value which is smaller than the acceleration mode start threshold value corresponding to the vehicle speed.

Referring to FIG. 9 used in the aforementioned embodiment, the assist amount of the motor 2 increases as the engine rotational speed Ne and throttle valve opening degree TH increase. Referring to FIG. 13 and FIG. 14, the regeneration amount of the motor 2 increases as the engine rotational speed Ne and intake pipe pressure PB increase.

Furthermore, in the aforementioned embodiment, although the MOTECU 11 for motor control and the ENGECU 12 for engine control are provided individually, a single ECU may be used for controlling both of the motor and engine.

Still furthermore, in the aforementioned embodiment, although the incline of a road is estimated based on the vehicle parameters such as the throttle valve opening degree variation and vehicle speed, the incline of the road may be determined based on the output of a vehicle-mounted incline sensor.

In the aforementioned embodiment, although a capacitor is used as a power storage device, for example, a high-capacity battery which can store and output a voltage higher than 12 V may be used in place of the capacitor.

As mentioned above, in the control apparatus for a hybrid vehicle according to the present invention, since the operating mode is determined to be the acceleration mode or the cruising mode in accordance with the engine rotational speed of an internal combustion engine and throttle valve opening degree or the vehicle speed of the vehicle and throttle valve opening degree, the operation mode can be changed from the acceleration to cruising mode in consideration of improving fuel consumption of the engine and ensuring good drivability.

Furthermore, in the control apparatus for a hybrid vehicle according to the present invention, the acceleration mode is determined when the throttle valve opening degree has exceeded the acceleration mode start threshold value corresponding to the engine rotational speed or the vehicle speed and the cruising mode is determined when the throttle valve opening degree has fallen below the acceleration mode end threshold value which is less than the acceleration mode start threshold value and which corresponds to the engine rotational speed or the vehicle speed, an undesired mode change between the acceleration and cruising mode, caused by a slight operation variation of the throttle valve, can be suppressed to allow for improving drivability.

Still furthermore, in the control apparatus for a hybrid vehicle according to the present invention, data maps for setting the assist amount showing the electric power level supplied from a storage device to a generator are provide for as many as the number that is determined by the gear ratio of the transmission and the air/fuel ratio of the supply mixture of the internal combustion engine with the engine rotational speed and the throttle valve opening degree as the parameters; the gear ratio of the transmission and the air/fuel ratio of the supply mixture of the internal combustion engine are detected; a data map corresponding to respective detection results of the gear ratio of the transmission and the air/fuel ratio of the supply mixture of the internal combustion engine is selected out of a plurality of the data maps provided; an assist amount corresponding to the engine rotational speed and the throttle valve opening degree is set using the data map selected; the assist amount thus set is corrected in response to the output voltage of the storage device; and the assist operation is performed in accordance with the corrected assist amount. With this configuration, according to the control apparatus of the present invention, since not only the engine rotational speed and throttle valve opening degree but also the operating conditions of the transmission resulting from the operator and the air/fuel ratio of the supply mixture are taken into account, fuel consumption of the engine can be reduced and at the same time the setting of the assist amount can be optimized to operate the motor at high efficiency.

In the control apparatus for a hybrid vehicle, according to the present invention, since the acceleration mode start threshold value and acceleration mode end threshold value are gradually increased while the vehicle is climbing a sloping road or traveling at high speed, and the acceleration mode start threshold value and acceleration mode end threshold value are gradually decreased when the vehicle is not climbing a sloping road or running at high speed, the cruising mode region is extended while the vehicle is either climbing an inclined road or traveling at high speed and the acceleration mode is employed when the throttle valve opening degree has becomes exceedingly large. Accordingly, while the vehicle is climbing a sloping road or traveling at high speed, the storage device can be charged by the regeneration operation in the cruising mode and unnecessary use of the electric power stored in the storage device can be prevented.

Furthermore, in the control apparatus for a hybrid vehicle, according to the present invention, the acceleration mode start threshold value and acceleration mode end threshold value are gradually increased while the vehicle is climbing an inclined road or traveling at high speed when a variation of the throttle valve opening degree per unit time is smaller than an opening level variation corresponding to the electric power of the storage device. Thus, the storage device can be charged by the regenerative operation with the operating mode shifted comparatively to the cruising mode even in the case of a large opening level variation of the throttle valve where the storage device has a slight amount of power left.

Still furthermore, in the control apparatus for a hybrid vehicle according to the present invention, the acceleration mode start threshold value and the acceleration mode end threshold value are initialized when the variation of the throttle valve opening degree per unit time is equal to or greater than the opening level variation corresponding to the amount of electric power stored in the storage device. Then the acceleration mode is employed immediately when the throttle valve opening degree suddenly changes, and thus the output of the engine can be assisted by a motor.

Furthermore, in the control apparatus for a hybrid vehicle, according to the present invention, since a target voltage of the storage device is set in accordance with the vehicle speed, and the acceleration mode start threshold value and the acceleration mode end threshold value are increased by correction value corresponding to the difference in voltage between the output voltage of the storage device and the target voltage, the cruising mode region is expanded in response to the relationship between the vehicle speed and the output voltage of the storage device, and thus the energy stored in the storage device can be efficiently utilized.

Still furthermore, by varying the correction value in accordance with the size of the load of the internal combustion engine, for example, when the engine load is increased due to the use of an air-conditioner, the cruising mode region is expanded and necessary energy can be stored in the storage device by generative operation.

What is claimed is:

1. A control apparatus for a hybrid vehicle having an internal combustion engine and a dynamotor as drive sources of said vehicle, said dynamotor operating as a motor for assisting the output of said internal combustion engine and operating as a generator for regenerating running energy of said vehicle, said apparatus comprising:

control means responsive to operating conditions of said vehicle for controlling an assist operation for supplying electric power from a storage device to said dynamotor and a regenerative operation for charging said storage device by the generated power of said dynamotor; and determination means for determining that the operating condition of said vehicle is in one of a plurality of operation modes including at least an acceleration mode for performing the assist operation and a cruising mode for selectively performing the assist operation and the regenerative operation, wherein said determination means determines that the operating condition of said vehicle is in the acceleration mode when a throttle valve opening degree of said internal combustion engine has exceeded an acceleration mode start threshold value corresponding to one of an engine rotational speed and a vehicle speed and determines that the operating condition of said vehicle is in the cruising mode when the throttle valve opening degree has fallen below an acceleration mode end threshold value which is less than said acceleration mode start threshold value and which corresponds to one of the engine rotational speed and the vehicle speed.

2. A control apparatus for a hybrid vehicle having an internal combustion engine and a dynamotor as drive sources of said vehicle, said dynamotor operating as a motor for assisting the output of said internal combustion engine and operating as a generator for regenerating running energy of said vehicle, said apparatus comprising:

control means responsive to operating conditions of said vehicle for controlling an assist operation for supplying electric power from a storage device to said dynamotor and a regenerative operation for charging said storage device by the generated power of said dynamotor; and determination means for determining that the operating condition of said vehicle is in an acceleration mode for performing the assist operation when a throttle valve opening degree of said internal combustion engine has exceeded an acceleration mode start threshold value corresponding to one of an engine rotational speed and a vehicle speed and for determining that the operating condition of said vehicle is in the cruising mode for selectively performing the assist operation and the regenerative operation when the throttle valve opening degree has fallen below an acceleration mode end threshold value which is less than said acceleration mode start threshold value and which corresponds to one of the engine rotational speed and the vehicle speed, wherein said control means includes a number of data maps for setting the assist amount showing an electric power level to be supplied from said storage device to said dynamotor having parameters of the engine rotational speed and the throttle valve opening degree, the number of data maps being determined by a number of gear ratios of a transmission and an air/fuel ratio of the supply mixture of said internal combustion engine; said control means detecting the gear ratio of said transmission and the air/fuel ratio of the supply mixture of said internal combustion engine; selecting a data map corresponding to respective detection results of the gear ratio of said transmission and the air/fuel ratio of the supply mixture of said internal combustion engine from said data maps; setting an assist amount corresponding to the engine rotational speed and the throttle valve opening degree by using the selected data map; corrects the assist amount set in accordance with the output voltage of said storage device; and performing the assist operation in accordance with the corrected assist amount.

3. A control apparatus for a hybrid vehicle having an internal combustion engine and a dynamotor as drive sources of said vehicle, said dynamotor operating as a motor for assisting the output of said internal combustion engine and operating as a generator for regenerating running energy of said vehicle, said apparatus comprising:

control means responsive to operating conditions of said vehicle for controlling an assist operation for supplying electric power from a storage device to said dynamotor and a regenerative operation for charging said storage device by the generated power of said dynamotor; and determination means for determining that the operating condition of said vehicle is in an acceleration mode for performing the assist operation when a throttle valve opening degree of said internal combustion engine has exceeded an acceleration mode start threshold value corresponding to one of an engine rotational speed and a vehicle speed and for determining that the operating condition of said vehicle is in the cruising mode for selectively performing the assist operation and the regenerative operation when the throttle valve opening degree has fallen below an acceleration mode end threshold value which is less than said acceleration mode start threshold value and which corresponds to one of the engine rotational speed and the vehicle speed, wherein said acceleration mode start threshold value and said acceleration mode end threshold value are gradually increased while said vehicle is climbing an inclined road or running at high speed, and said acceleration mode start threshold value and said acceleration mode end threshold value are gradually decreased when said vehicle is not climbing an inclined road or running at high speed.

4. The control apparatus according to claim 3, wherein said acceleration mode start threshold value and said acceleration mode end threshold value are gradually increased when a variation of said throttle valve opening degree per unit time is less than an opening level variation corresponding to the electric power of said storage device.

5. The control apparatus according to claim 3, wherein said acceleration mode start threshold value and said acceleration mode end threshold value are initialized when a variation of said throttle valve opening degree per unit time is equal to or greater than the opening level variation corresponding to the amount of the electric power stored in said storage device.

6. A control apparatus for a hybrid vehicle having an internal combustion engine and a dynamotor as drive sources of said vehicle, said dynamotor operating as a motor for assisting the output of said internal combustion engine and operating as a generator for regenerating running energy of said vehicle, said apparatus comprising:

control means responsive to operating conditions of said vehicle for controlling an assist operation for supplying electric power from a storage device to said dynamotor and a regenerative operation for charging said storage device by the generated power of said dynamotor; and determination means for determining that the operating condition of said vehicle is in an acceleration mode for performing the assist operation when a throttle valve opening degree of said internal combustion engine has exceeded an acceleration mode start threshold value corresponding to one of an engine rotational speed and a vehicle speed and for determining that the operating condition of said vehicle is in the cruising mode for selectively performing the assist operation and the regenerative operation when the throttle valve opening degree has fallen below an acceleration mode end threshold value which is less than said acceleration mode start threshold value and which corresponds to one of the engine rotational speed and the vehicle speed, wherein a target voltage of said storage device is set in accordance with the vehicle speed, and said acceleration mode start threshold value and said acceleration mode end threshold value are increased by a correction value corresponding to a difference in voltage between the output voltage of said storage device and said target voltage.

7. The control apparatus according to claim 6, wherein said correction value is varied in accordance with the size of a load of said internal combustion engine.

8. A control apparatus for a hybrid vehicle having an internal combustion engine and a dynamotor as drive sources of said vehicle, said dynamotor operating as a motor for assisting the output of said internal combustion engine and operating as a generator for regenerating running energy of said vehicle, said apparatus comprising:

control means responsive to operating conditions of said vehicle for controlling an assist operation for supplying electric power from a storage device to said dynamotor and a regenerative operation for charging said storage device by the generated power of said dynamotor; and determination means for determining that the operating condition of said vehicle is in an acceleration mode for performing the assist operation when a throttle valve opening degree of said internal combustion engine has exceeded an acceleration mode start threshold value corresponding to one of an engine rotational speed and a vehicle speed and for determining that the operating condition of said vehicle is in the cruising mode for selectively performing the assist operation and the regenerative operation when the throttle valve opening degree has fallen below an acceleration mode end threshold value which is less than said acceleration mode start threshold value and which corresponds to one of the engine rotational speed and the vehicle speed, wherein said acceleration mode start threshold value and said acceleration mode end threshold value are gradually increased while said vehicle is climbing an inclined road or running at high speed, and said acceleration mode start threshold value and said acceleration mode end threshold value are gradually decreased when said vehicle is not climbing an inclined road or running at high speed.

9. The control apparatus according to claim 8, wherein said acceleration mode start threshold value and said acceleration mode end threshold value are gradually increased when a variation of said throttle valve opening degree per unit time is less than an opening level variation corresponding to the electric power of said storage device.

10. The control apparatus according to claim 8, wherein said acceleration mode start threshold value and said acceleration mode end threshold value are initialized when a variation of said throttle valve opening degree per unit time is equal to or greater than the opening level variation corresponding to the amount of the electric power stored in said storage device.

11. A control apparatus for a hybrid vehicle having an internal combustion engine and a dynamotor as drive sources of said vehicle, said dynamotor operating as a motor for assisting the output of said internal combustion engine and operating as a generator for regenerating running energy of said vehicle, said apparatus comprising:

control means responsive to operating conditions of said vehicle for controlling an assist operation for supplying electric power from a storage device to said dynamotor and a regenerative operation for charging said storage device by the generated power of said dynamotor; and determination means for determining that the operating condition of said vehicle is in an acceleration mode for performing the assist operation when a throttle valve opening degree of said internal combustion engine has exceeded an acceleration mode start threshold value corresponding to one of an engine rotational speed and a vehicle speed and for determining that the operating condition of said vehicle is in the cruising mode for selectively performing the assist operation and the regenerative operation when the throttle valve opening degree has fallen below an acceleration mode end threshold value which is less than said acceleration mode start threshold value and which corresponds to one of the engine rotational speed and the vehicle speed, wherein a target voltage of said storage device is set in accordance with the vehicle speed, and said acceleration mode start threshold value and said acceleration mode end threshold value are increased by a correction value corresponding to a difference in voltage between the output voltage of said storage device and said target voltage.

12. The control apparatus according to claim 11, wherein said correction value is varied in accordance with the size of a load of said internal combustion engine.

* * * * *